US010156829B2

(12) United States Patent
Sato

(10) Patent No.: US 10,156,829 B2
(45) Date of Patent: Dec. 18, 2018

(54) HOLOGRAPHIC MICROSCOPE AND DATA PROCESSING METHOD FOR HIGH-RESOLUTION HOLOGRAM IMAGE

(71) Applicant: University of Hyogo, Kobe-shi, Hyogo (JP)

(72) Inventor: Kunihiro Sato, Himeji (JP)

(73) Assignee: University of Hyogo, Kobe-shi (JP)

( * ) Notice: Subject to any disclaimer, the term of this patent is extended or adjusted under 35 U.S.C. 154(b) by 187 days.

(21) Appl. No.: 15/032,434

(22) PCT Filed: Oct. 28, 2014

(86) PCT No.: PCT/JP2014/005448
§ 371 (c)(1),
(2) Date: Apr. 27, 2016

(87) PCT Pub. No.: WO2015/064088
PCT Pub. Date: May 7, 2015

(65) Prior Publication Data
US 2016/0259297 A1 Sep. 8, 2016

(30) Foreign Application Priority Data

Oct. 28, 2013 (JP) .................................. 2013-223761

(51) Int. Cl.
*G03H 1/04* (2006.01)
*G02B 21/00* (2006.01)
(Continued)

(52) U.S. Cl.
CPC ........... *G03H 1/0443* (2013.01); *G02B 21/00* (2013.01); *G02B 21/365* (2013.01);
(Continued)

(58) Field of Classification Search
CPC ... G03H 2001/0463; G03H 2001/0445; G03H 2001/0471; G03H 2001/0469;
(Continued)

(56) References Cited

U.S. PATENT DOCUMENTS

2013/0100241 A1* 4/2013 Sato ...................... G02B 21/06
348/40
2014/0268105 A1* 9/2014 Bills .................... G03H 1/0443
356/51
2015/0268628 A1 9/2015 Sato

FOREIGN PATENT DOCUMENTS

WO    WO 2012/005315 A1    1/2012
WO    WO 2014/054776 A1    4/2014
WO    WO 2013/047709 A1    3/2015

OTHER PUBLICATIONS

European Search Report issued in counterpart European Application No. 14857928.7 dated Jun. 27, 2017 (10 pages).
Sato et al., "Lens-less holographic microscope with high resolving power", Proc. of SPIE, Feb. 8, 2010, eight pages, vol. 7619, Dept. of Electrical Eng. And Computer Science, Graduate School of Engineering, University of Hyogo, Hyogo, Japan.
(Continued)

*Primary Examiner* — Loi H Tran
(74) *Attorney, Agent, or Firm* — Crowell & Moring LLP

(57) ABSTRACT

The present invention can realize both a transmission type and a reflection type, and provides a holographic microscope which can exceed the resolution of the conventional optical microscope, a hologram data acquisition method for a high-resolution image, and a high-resolution hologram image reconstruction method. In-line spherical wave reference light (L) is recorded in a hologram ($I_{LR}$) using spherical wave reference light (R), and an object light (O$^j$) and an illumination light (Q$^j$) are recorded in a hologram ($I^j_{OQR}$) using a spherical wave reference light (R) by illuminating the object with an illumination light (Q$^j$, j=1, . . . , N) which is changed its incident direction. From those holograms, a hologram ($J^j_{OQL}$), from which the component of the reference light (R) is removed, is generated, and from the hologram, a light wave (h$^j$) is generated. A light wave (c$^j$) of the illumination light (Q$^j$) is separated from the light wave (h$^j$), and using its phase component ($\xi^j = c^j/|c^j|$), a phase adjustment reconstruction light wave is derived and added up as ($H_P = \Sigma h^j/\xi^j$), and an object image ($S_P = |H_P|^2$) is reconstructed.

17 Claims, 20 Drawing Sheets

(51) Int. Cl.
*G02B 21/36* (2006.01)
*G03H 1/00* (2006.01)
(52) U.S. Cl.
CPC . *G03H 2001/005* (2013.01); *G03H 2001/046* (2013.01); *G03H 2001/0445* (2013.01); *G03H 2001/0447* (2013.01); *G03H 2001/0452* (2013.01); *G03H 2001/0463* (2013.01); *G03H 2001/0469* (2013.01); *G03H 2001/0471* (2013.01); *G03H 2222/44* (2013.01); *G03H 2240/56* (2013.01)
(58) Field of Classification Search
CPC ....... G03H 2001/005; G03H 2001/046; G03H 2222/44; G03H 2240/56; G03H 1/0443; G02B 21/00
USPC .......................................................... 348/40
See application file for complete search history.

(56) References Cited

OTHER PUBLICATIONS

Schwarz et al., "Imaging interferometric microscopy", Optical Society of America, Aug. 15, 2003, pp. 1424-1426, vol. 38, No. 16, Center for High Technology Materials and Department of Physics and Astronomy, University of New Mexico, Albuquerque, New Mexico.
International Search Report (PCT/ISA/210 & PCT/ISA/220) issued in PCT Application No. PCT/JP2014/005448 dated Jan. 13, 2015 with English translation (five pages).
Japanese-language Written Opinion (PCT/ISA/237) issued in PCT Application No. PCT/JP2014/005448 dated Jan. 13, 2015 (three pages).

\* cited by examiner

TRANSMISSION TYPE

TRANSMISSION TYPE

TRANSMISSION TYPE

TRANSMISSION TYPE

TRANSMISSION TYPE

TRANSMISSION TYPE

TRANSMISSION TYPE

TRANSMISSION TYPE

TRANSMISSION TYPE

REFLECTION TYPE

REFLECTION TYPE

REFLECTION TYPE

REFLECTION TYPE

TRANSMISSION TYPE
ILLUMINATION LIGHT
(BEFORE PHASE ADJUSTMENT)

TRANSMISSION TYPE
OBJECT LIGHT
(BEFORE PHASE ADJUSTMENT)

TRANSMISSION TYPE
ILLUMINATION LIGHT
(AFTER PHASE ADJUSTMENT)

TRANSMISSION TYPE
OBJECT LIGHT
(AFTER PHASE ADJUSTMENT)

TRANSMISSION TYPE

TRANSMISSION TYPE

BEFORE PHASE ADJUSTMENT (h)

AFTER PHASE ADJUSTMENT (h/ξ)

(PRACTICAL EXAMPLE)

25 μm (REFERENCE EXAMPLE)

25 μm

HOLOGRAPHIC MICROSCOPE AND DATA PROCESSING METHOD FOR HIGH-RESOLUTION HOLOGRAM IMAGE

TECHNICAL FIELD

The present invention relates to a holographic microscope and a data processing method for a high-resolution hologram image based on an off-axis holography using a spherical wave reference light.

BACKGROUND ART

Conventionally, a transmission type or a reflection type holographic microscope are known which can reconstruct an image of a minute object by recording a complex amplitude in-line hologram of a large numerical aperture by one shot and without using any imaging lens (for example, refer to patent document 1). Since this microscope does not use any imaging lens, it can solve the problem of the influence of medium or an imaging lens in the conventional optical microscope.

PRIOR ART DOCUMENT

Patent Document

Patent document 1: WO2012/005315

DISCLOSURE OF THE INVENTION

However, the holographic microscope shown in the patent document 1 mentioned above has a theoretical limit that its resolution cannot exceed a half wave length of light, like the conventional optical microscope. As a microscope of exceeding such a resolution limit, a structured illumination microscopy (SIM) has been developed which uses a moire effect. This SIM can exceed the limit of the above mentioned resolution. However, SIM uses an imaging lens and has many problems accompanying the use of the imaging lens like other optical microscopes. Moreover, SIM is complicated in structure, very expensive, and not easy to handle. Furthermore, since it is difficult to apply the moire effect to a transmission type microscope, SIM is only put in practical use for the reflection type one, and not put in practical use for the transmission type one.

The present invention solves the above-mentioned subject, by easy construction, and an object of the invention is to provide a holographic microscope and a data processing method for a high-resolution hologram image which can exceed the resolution of the conventional optical microscope and can realize both the transmission type and the reflection type.

In order to attain the above-mentioned subject, the holographic microscope of the present invention comprises: a data acquisition unit which acquires a hologram of an object, and an image reconstruction unit which reconstructs an image of the object from the hologram acquired by the data acquisition unit, wherein the data acquisition unit comprises: an optical system which generates an in-line spherical wave reference light (L), an illumination light (Q), and an off-axis spherical wave reference light (R) with a coherent light emitted by a light source, and transmits the generated lights and an object light (O) emitted from the object illuminated with the illumination light (Q); an angle change unit which changes an incident direction of the illumination light (Q) on the object; a photo-detector which changes a light intensity into an electric signal and outputs it; and a storing unit which stores a reference light off-axis hologram ($I_{LR}$) of interference fringes between the in-line spherical wave reference light (L) and the off-axis spherical wave reference light (R), object light off-axis holograms ($J^j_{OR}$, j=1, ..., N) of interference fringes between the off-axis spherical wave reference light (R) and object lights ($O^j$, j=1, ..., N) emitted from the object illuminated with the illumination lights ($Q^j$, j=1, ..., N) having different incident directions ($\theta^j$, j=1, ..., N) generated from the coherent light by using the optical system and the angle change unit, and illumination light off-axis holograms ($J^j_{QR}$, j=1, ..., N) of interference fringes between the illumination lights ($Q^j$, j=1, ..., N) and the off-axis spherical wave reference light (R), in a memory by using the photo-detector, and the image reconstruction unit comprises: a make-in-line modulation unit which generates an object light complex amplitude in-line hologram ($J^j_{OL}$) and an illumination light complex amplitude in-line hologram ($J^j_{QL}$), from the reference light off-axis hologram ($I_{LR}$), the object light off-axis hologram ($J^j_{OR}$), and the illumination light off-axis hologram ($J^j_{QR}$), by eliminating a component of the off-axis spherical wave reference light (R) for each of the incident directions ($\theta^j$, j=1, ..., N); a light wave calculation unit which derives, for each of the incident directions ($\theta^j$, j=1, ..., N) on an arbitrary reconstruction plane ($z=z_P$), from the object light complex amplitude in-line hologram ($J^j_{OL}$) and the illumination light complex amplitude in-line hologram ($J^j_{QL}$), a reconstructed object light wave ($h^j$) of the object light ($O^j$), a reconstructed illumination light wave ($c^j$) of the illumination light ($Q^j$), a phase component ($\xi^j = c^j/|c^j|$) contained in the reconstructed illumination light wave ($c^j$), and a phase adjusted reconstruction light wave ($h^j/\xi^j$) made by removing the phase component ($\xi^j$) from the reconstructed object light wave ($h^j$); and an image calculation unit which derives a synthetic light wave ($H_P = \Sigma h^j/\xi^j$) on the arbitrary reconstruction plane ($z=z_P$) by adding up the phase adjusted reconstruction light waves ($h^j/\xi^j$) for the incident directions ($\theta^j$, j=1, ..., N), and reconstructs an object image ($S_P = |H_P|^2$) by using the synthetic light wave ($H_P$).

In this holographic microscope, the image reconstruction unit further comprises: a pixel number increase unit which generates a pixel-increased object light complex amplitude in-line hologram ($K^j_{OL}$) and a pixel-increased illumination light complex amplitude in-line hologram ($K^j_{QL}$) having substantially increased number of pixels by subdividing a spatial sampling interval of the object light complex amplitude in-line hologram ($J^j_{OL}$) and the illumination light complex amplitude in-line hologram ($J^j_{QL}$) and performing a data interpolation to a new sampling point produced by the subdividing; and the light wave calculation unit derives the phase adjusted reconstruction light wave ($h^j/\xi^j$) by using the pixel-increased object light complex amplitude in-line hologram ($K^j_{OL}$) and the pixel-increased illumination light complex amplitude in-line hologram ($K^j_{QL}$).

In this holographic microscope, the image reconstruction unit further comprises an illumination light separation unit which separates and generates a reconstructed light wave of the illumination light ($Q^j$) from a hologram in which the object light ($O^j$) and the illumination light ($Q^j$) are recorded without being separated, and the storing unit stores a hologram of interference fringes between the object light ($O^j$), the illumination light ($Q^j$), and the off-axis spherical wave reference light (R) in the memory as an object light illumination light off-axis hologram ($J^j_{OQR}$) when the object light ($O^j$) and the illumination light ($Q^j$) are not separated each other, the make-in-line modulation unit generates an object light illumination light complex amplitude in-line hologram ($J_{OQR}$) from the reference light off-axis hologram ($I_{LR}$) and the object light illumination light off-axis hologram ($I^j_{OQR}$) by eliminating the component of the off-axis spherical wave reference light (R), the illumination light separation unit generates, on a specific reconstruction plane ($z=z_S$), a reconstructed object light wave ($h^j$), which is a reconstructed light wave of the object light ($O^j$) containing the illumination light ($Q^j$), from the object light illumination light complex amplitude in-line hologram ($J^j_{OQR}$), and separates and generates a reconstructed illumination light wave ($c^j$), which is a reconstructed light wave of the illumination light ($Q^j$), from the reconstructed object light wave ($h^j$), the light wave calculation unit generates a new reconstructed object light wave ($h^j$) and a new reconstructed illumination light wave ($c^j$) by propagating the reconstructed object light wave ($h^j$) and the reconstructed illumination light wave ($c^j$) generated by the illumination light separation unit to the arbitrary reconstruction plane ($z=z_P$) different from the specific reconstruction plane ($z=z_S$), and derives the phase adjusted reconstruction light wave ($h^j/\xi^j$) by using the new reconstructed illumination light waves.

In this holographic microscope, the image reconstruction unit further comprises a pixel number increase unit which generates a pixel-increased object light illumination light complex amplitude in-line hologram ($K^j_{OQL}$) having substantially increased number of pixels by subdividing a spatial sampling interval of the object light illumination light complex amplitude in-line hologram ($J^j_{OQL}$) and performing a data interpolation to a new sampling point produced by the subdividing, and the illumination light separation unit derives the reconstructed object light wave ($h^j$) by using the pixel-increased object light illumination light complex amplitude in-line hologram ($K^j_{OQL}$).

In this holographic microscope, the angle change unit comprises a condenser and a reflector, wherein the reflector makes a parallel light having a larger diameter than that of the condenser go into the condenser from an arbitrary direction leaning to an optic axis of the condenser.

The data processing method for a high-resolution hologram image of the present invention comprises the steps of: acquiring a reference light off-axis hologram ($I_{LR}$) of interference fringes between an in-line spherical wave reference light (L) and an off-axis spherical wave reference light (R); and acquiring object light off-axis holograms ($I^j_{OR}$, j=1, ..., N) of interference fringes between the off-axis spherical wave reference light (R) and object lights ($O^j$, j=1, ..., N) emitted from an object illuminated with illumination lights ($Q^j$, j=1, ..., N) having different incident directions ($\theta^j$, j=1, ..., N), and illumination light off-axis holograms ($I^j_{QR}$, j=1, ..., N) of interference fringes between the illumination lights ($Q^j$, j=1, ..., N) and the off-axis spherical wave reference light (R) for each of the incident directions, wherein the off-axis holograms ($I_{LR}$, $I^j_{OR}$, $I^j_{QR}$, j=1, ..., N) are acquired under conditions that each of the object lights ($O^j$, j=1, ..., N) is emitted from a localized region, and the localized region and virtual-point-light-sources of the in-line spherical wave reference light (L) and the off-axis spherical wave reference light (R) are in close proximity to each other.

In this data processing method for a high-resolution hologram image of the present invention, the off-axis spherical wave reference light (R) is a reflection light from a minute sphere surface.

In this data processing method for a high-resolution hologram image of the present invention, a plurality of photo-detectors are arranged so that the photo-detectors face the localized region where the object lights are emitted, and each of the holograms is acquired by using the plurality of the photo-detectors.

In this data processing method for a high-resolution hologram image of the present invention, it further comprises the steps of: deriving a synthetic light wave ($H_P$) by adding up light waves of the object lights ($O^j$, j=1, ..., N) after adjusting phases thereof on an arbitrary reconstruction plane ($z=z_P$); and reconstructing an object image ($S_P=|H_P|^2$) by using the synthetic light wave ($H_P$), wherein the adjusting of the phases is performed based on that the object light ($O^j$) recorded in the hologram is a superposed light of reflection lights generated by reflection of the illumination light ($Q^j$) at each point in the localized region of the object, and a phase of the reflection light composing the object light ($O^j$) at a position where the reflection light is generated and a phase of the illumination light ($Q^j$) generating the reflection light at the position are equal.

In this data processing method for a high-resolution hologram image of the present invention, it further comprises the steps of generating object light complex amplitude in-line hologram ($J^j_{OL}$) and illumination light complex amplitude in-line hologram ($J^j_{QL}$), from the reference light off-axis hologram ($I_{LR}$), the object light off-axis hologram ($I^j_{OR}$), and the illumination light off-axis hologram ($I^j_{QR}$), by eliminating a component of the off-axis spherical wave reference light (R), for each of the incident directions ($\theta^j$, j=1, ..., N); deriving, for each of the incident directions ($\theta^j$, j=1, ..., N) on an arbitrary reconstruction plane ($z=z_P$), from the object light complex amplitude in-line hologram ($J^j_{OL}$) and the illumination light complex amplitude in-line hologram ($J^j_{QL}$), a reconstructed object light wave ($h^j$) of the object light ($O^j$), a reconstructed illumination light wave ($c^j$) of the illumination light ($Q^j$), a phase component ($\xi^j=c^j/|c^j|$) contained in the reconstructed illumination light wave ($c^j$), and a phase adjusted reconstruction light wave ($h^j/\xi^j$) made by removing the phase component ($\xi^j$) from the reconstructed object light wave ($h^j$); and deriving a synthetic light wave ($H_P=\Sigma h^j/\xi^j$) on the arbitrary reconstruction plane ($z=z_P$) by adding up the phase adjusted reconstruction light waves ($h^j/\xi^j$) for the incident directions ($\theta^j$, j=1, ..., N), and then reconstructs an object image ($S_P=|H_P|^2$) by using the synthetic light wave ($H_P$).

In this data processing method for a high-resolution hologram image of the present invention, it further comprises the steps of: generating a pixel-increased object light complex amplitude in-line hologram ($K^j_{OL}$) and a pixel-increased illumination light complex amplitude in-line hologram ($K^j_{QL}$) having substantially increased number of pixels by subdividing a spatial sampling interval of the object light complex amplitude in-line hologram ($J^j_{OL}$) and the illumination light complex amplitude in-line hologram ($J^j_{QL}$) and performing a data interpolation to a new sampling point produced by the subdividing; and deriving the phase adjusted reconstruction light wave ($h^j/\xi^j$) using the pixel-increased object light complex amplitude in-line hologram ($K^j_{OL}$) and the pixel-increased illumination light complex amplitude in-line hologram ($K^j_{QL}$).

In this data processing method for a high-resolution hologram image of the present invention, an object light illumination light off-axis hologram ($I^j_{OR}$) for each of the incident directions ($\theta^j$, j=1, ..., N) is acquired which is of interference fringes between the object lights ($O^j$), the illumination light ($Q^j$), and the off-axis spherical wave reference light (R) when the object light ($O^j$) and the illumination light ($Q^j$) are not separated each other, wherein the off-axis holograms ($I_{LR}$, $I^j_{OQR}$, j=1, ..., N) are acquired under conditions that the localized region and the virtual-point-light-sources of the in-line spherical wave reference light (L) and the off-axis spherical wave reference light (R) are in close proximity to each other.

In this data processing method for a high-resolution hologram image of the present invention, the illumination lights ($Q^j$, j=1, . . . , N) have a condensing point and recorded in the object light illumination light off-axis holograms ($I^j_{OQR}$) in a spread state after passing the condensing point.

In this data processing method for a high-resolution hologram image of the present invention, it further comprises the steps of: generating object light illumination light complex amplitude in-line holograms ($J^j_{OQR}$) from the reference light off-axis hologram ($I_{LR}$) and the object light illumination light off-axis holograms ($I^j_{OQR}$), by eliminating component of the off-axis spherical wave reference light (R) for each of the incident directions ($\theta^j$, j=1, . . . , N); generating, on a specific reconstruction plane ($z=z_S$), a reconstructed object light wave ($h^j$), which is a reconstructed light wave of the object light ($O^j$) containing the illumination light ($Q^j$), from the object light illumination light complex amplitude in-line hologram ($J^j_{OQR}$), and separating a reconstructed illumination light wave ($c^j$), which is a reconstructed light wave of the illumination light ($Q^j$), from the reconstructed object light wave ($h^j$) for each of the incident directions ($\theta^j$, j=1, . . . , N); generating a new reconstructed object light wave ($h^j$) and a new reconstructed illumination light wave ($c^j$) by propagating the reconstructed object light wave ($h^j$) and the reconstructed illumination light wave ($c^j$) to an arbitrary reconstruction plane ($z=z_P$) different from the specific reconstruction plane ($z=z_S$), and deriving, on the arbitrary reconstruction plane ($z=z_P$), a phase component ($\xi^j=c^j/|c^j|$) contained in the reconstructed illumination light wave ($c^j$) and a phase adjusted reconstruction light wave ($h^j/\xi^j$) by eliminating the phase component ($\xi^j$) from the reconstructed object light illumination light wave ($h^j$); and deriving a synthetic light wave ($H_P=\Sigma h^j/\xi^j$) on the arbitrary reconstruction plane ($z=z_P$) by adding up the phase adjusted reconstruction light waves ($h^j/\xi^j$) for the incident directions ($\theta^j$, j=1, . . . , N), and then reconstructing an object image ($S_P=|H_P|^2$) using the synthetic light wave ($H_P$).

In this data processing method for a high-resolution hologram image of the present invention, it further comprises the steps of: generating a pixel-increased object light illumination light complex amplitude in-line hologram ($K^j_{OQL}$) having substantially increased number of pixels by subdividing a spatial sampling interval of the object light illumination light complex amplitude in-line hologram ($J^j_{OQL}$) and performing a data interpolation to a new sampling point produced by the subdividing; and deriving the reconstructed object light wave ($h^j$) using the pixel-increased object light illumination light complex amplitude in-line hologram ($K^j_{OQL}$).

According to the holographic microscope and the data processing method for a high-resolution hologram image of the present invention, since a plurality of object lights recorded using a spherical wave reference light and multi-direction illumination lights are added up after adjusting using phase information on each of the illumination lights, an image can be reconstructed in a condition of large numerical aperture made by adding a numerical aperture of an illumination light and a numerical aperture of an object light. The resolution of the conventional optical microscope can be exceeded by the image reconstruction in the condition of large numerical aperture. Moreover, since the object light and the illumination light are recordable in a hologram for both a transmission type and a reflection type, any microscope of a transmission type and a reflection type can be realized.

MODE FOR CARRYING OUT THE INVENTION (An Image Reconstruction Method for a Minute Object)

Figure 1:
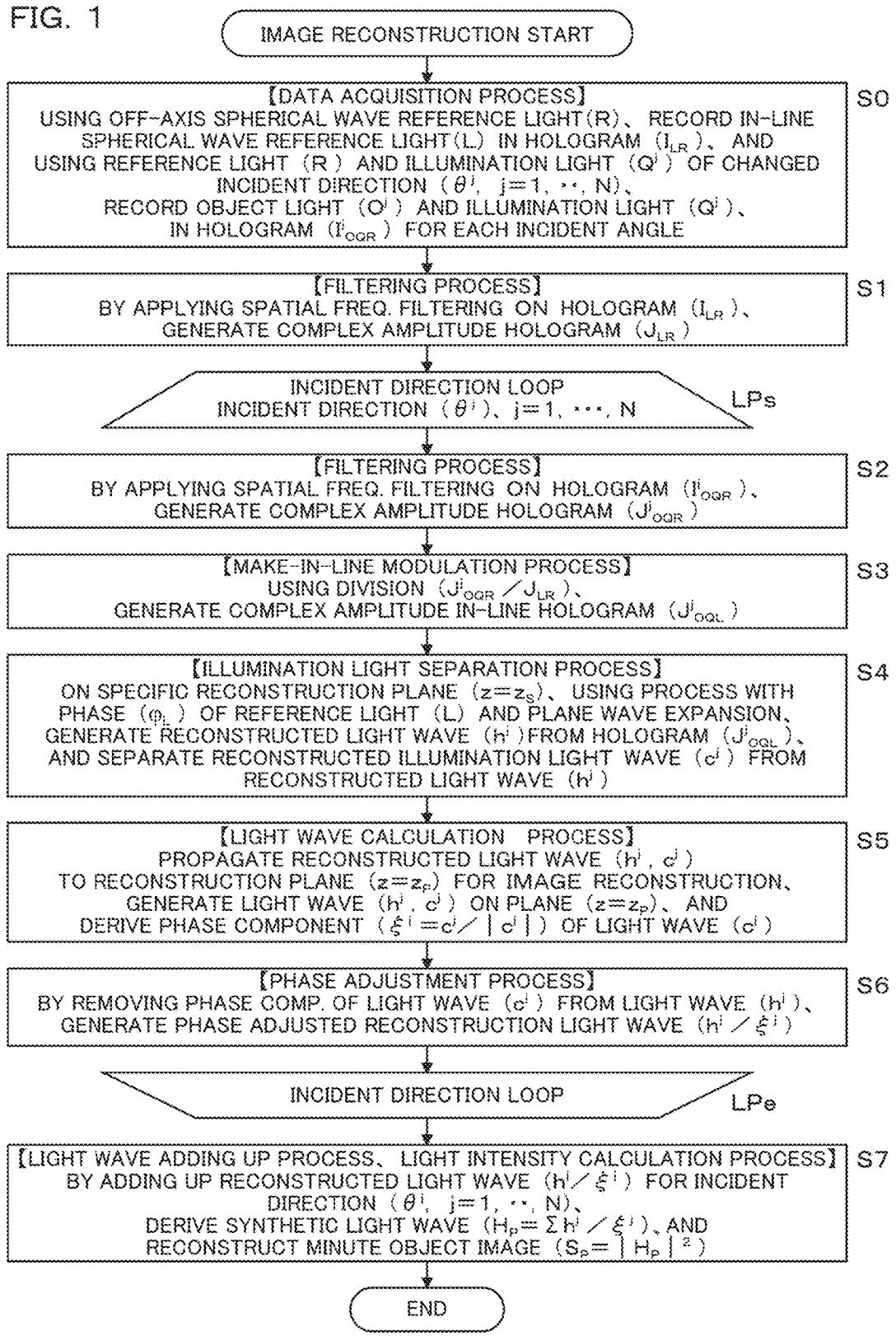
FIG. 1 is a flowchart showing a high-resolution hologram image reconstruction method according to an embodiment of the present invention.
Figure 2:
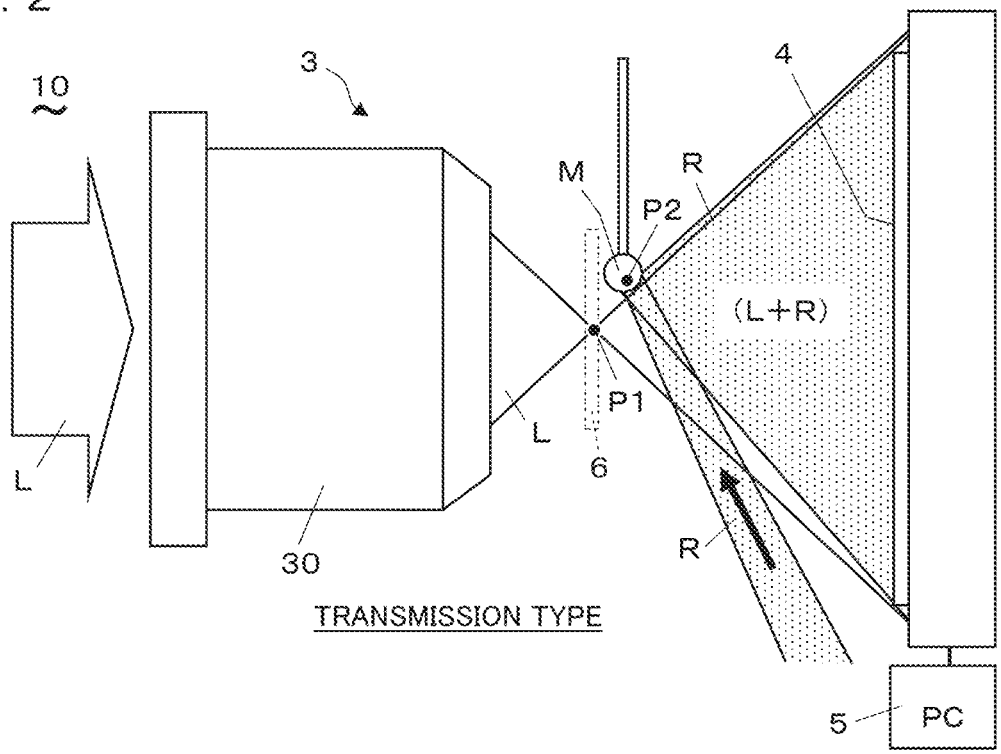
FIG. 2 is a side view of a transmission type equipment acquiring data of an in-line spherical wave reference light used for the image reconstruction method.

Hereafter, a data processing method for a high-resolution hologram image according to an embodiment of the present invention (a high-resolution hologram image reconstruction method, a hologram data acquisition method for a high-resolution image) and a holographic microscope are explained with reference to drawings. FIG. 1 to FIG. 12 show the high-resolution hologram image reconstruction method and the hologram data acquisition method for a high-resolution image. The image reconstruction method, as shown in FIG. 1, comprises a data acquisition process (S0) and subsequent processes (S1 to S7) of the image reconstruction for reconstructing an image by data processing. In the image reconstruction methods, light waves are reconstructed from each of digital holograms of large numerical aperture, in which object lights generated by illumination lights of multiple directions are recorded, and then an image is reconstructed, in a condition that a numerical aperture exceeds 1, by synthesizing the reconstructed light waves, on the ground of phase information of each of the illumination lights. The image reconstruction method can be used for an image reconstruction in the holographic microscope.

The numerical aperture NA in optics is a sine value of an angle $\theta_{NA}$ i.e. $\sin \theta_{NA}$ when the refractive index of the medium of light is assumed to be 1, wherein the angle $\theta_{NA}$ is an angle between a vertical line from a point P to a plane and a line segment from the point P to a boundary point of a bounded area defined on the plane. In other words, the numerical aperture NA is a sine value of an angle $\theta_{NA}$ defined as an angle looking two end points of a line segment from a point P, wherein the line segment is between one point on a plane at which a perpendicular line from the point P intersects the plane and another point at boundaries of a bounded area defined on the plane. A numerical aperture NA can be defined for a lens, a photo-detector, an illumination light, etc. by setting up the point P and the bounded area, and the value is less than or equal to 1 (NA=$\sin \theta_{NA}$<=1). The point P defining the numerical aperture NA is a focus point of the lens, an arbitrary point on the central line of the photo-detector (position of a point light source set up arbitrarily), and a point in a light source for the illumination light. The bounded area which defines the numerical aperture NA is an opening of a lens, an acceptance surface (effectively light-acceptable surface) of a photo-detector, and a field illuminated with a light spreading from a point light source of an illumination light.

(Outline Explanation)

In the data acquisition process (S0), an in-line spherical wave reference light L, an off-axis spherical wave reference light R, and illumination lights $Q^j$, j=, . . . , N which are illumination lights Q with changed incident directions $\theta^j$, j=1, . . . , N on an object are used, and interference fringes generated with those lights are recorded in a plurality of off-axis holograms $I_{LR}$, $I^j_{OQR}$, j=1, . . . , N. From hereon, the subscript j etc. which distinguishes the incident direction with a light or a mathematical expression depending on the incident direction are omitted suitably. The hologram $I_{LR}$ is an off-axis hologram in which the in-line spherical wave reference light L is recorded using the off-axis spherical wave reference light R. The hologram $I_{LR}$ is a hologram of the reference light R, and referred to suitably by aliases as a reference light hologram $I_{LR}$, a reference light off-axis hologram $I_{LR}$, or an off-axis hologram $I_{LR}$. The information of the in-line spherical wave reference lights L and the hologram $I_{LR}$ works as standard (or canonical, or basic) information during the hologram data processing.

The hologram $I^j_{OQR}$ is an off-axis hologram in which an object light $O^j$ emitted from the object illuminated with the illumination light Q and the illumination light $Q^j$ are recorded using the off-axis spherical wave reference light R. The hologram $I^j_{OQR}$ is a hologram of the object light $O^j$ and the illumination light $Q^j$, and referred to suitably by aliases as an object light illumination light hologram $I^j_{OQR}$, an object light illumination light off-axis hologram $I^j_{OQR}$, or an off-axis hologram $I^j_{OQR}$. Those holograms $I_{LR}$ and $I^j_{OQR}$ are acquired using spherical wave lights namely the in-line spherical wave reference light L and the off-axis spherical wave reference light R. Therefore, those holograms can be holograms of large numerical aperture (large NA number, however NA<1).

The processes (S1 to S7) of image reconstruction comprise a filtering process (S1) performed separately, processes (S2 to S6) performing a series of processes for each incident direction $\theta^j$ in an incident direction loop LPs-LPe, and a process (S7) unifying obtained results and reconstructing an image. In the filtering process (S1), a complex amplitude off-axis hologram $J_{LR}$ holding the information on the in-line spherical wave reference light L is generated by applying a spatial frequency filtering to the hologram $I_{LR}$. In the incident direction loop LPs-LPe, a filtering process (S2), a make-in-line modulation process (S3), an illumination light separation process (S4), a light wave calculation process (S5), and a phase adjustment process (S6) are performed.

In the filtering process (S2), a complex amplitude off-axis hologram $J^j_{OQR}$ holding the information on the object light (O and illumination light $Q^j$ is generated by applying a spatial frequency filtering to the hologram $I^j_{OQR}$. In the make-in-line modulation process (S3), a complex amplitude in-line hologram $J^j_{OQL}$ is generated, which is made to be in-line configuration by removing a component of the reference light R, by dividing the data of the complex amplitude off-axis hologram $J^j_{OQR}$ generated by the filtering process (S2) with the data of the complex amplitude off-axis hologram $J_{LR}$ similarly generated by the filtering process (S1).

In the illumination light separation process (S4), on a specific reconstruction plane $Z=z_S$, a reconstructed object light wave $h^j$, which is a reconstructed light wave of the object light $O^j$ and illumination light $Q^j$, is generated from the complex amplitude in-line hologram $J^j_{OQL}$, and then a reconstructed illumination light wave $c^j$, which is a reconstructed light wave of the illumination light $Q^j$, is separated and extracted from the reconstructed object light wave $h^j$. The reconstructed object light wave $h^j$ is a reconstructed light wave containing both of the object light $O^j$ and the illumination light $Q^j$. The reconstructed object light wave h and the reconstructed illumination light wave $c^j$ are simply denoted as reconstructed light waves $h^j$, $c^j$, or moreover as light waves $h^j$, $c^j$, etc. suitably. A modulation process using a phase $\varphi_L$ of the in-line spherical wave reference light L and a plane wave expansion process are performed when generating those reconstruction light waves. The reconstruction plane $z=z_S$ is set on a specific plane where it becomes easy to separately extract the reconstructed light wave $c^j$. The reconstruction plane is a plane parallel to an acceptance surface of a photo-detector, such as CCD, for example, used when acquiring the holograms. In this case, the z axis is an optic axis (central axis) of the acceptance surface set up as an axis intersecting perpendicularly with the acceptance surface, and one plane, which intersects perpendicularly with the z axis, can be specified by appointing a position on the z axis. An image is reconstructed on the plane perpendicular to the z axis.

In the light wave calculation process (S5), by propagating the reconstructed light waves $h^j$, $c^j$ from the specific reconstruction plane $z=z_S$ to an arbitrary reconstruction plane $z=z_P$, reconstructed light waves $h^j$, $c^j$ on the reconstruction plane $z=z_P$ are generated, and a phase component $\xi^j=c^j/|c^j|$ contained in the reconstructed light wave $c^j$ of the illumination light $Q^j$ is obtained.

In the phase adjustment process (S6), a phase adjusted reconstruction light wave $h^j/\xi^j$ is derived by removing the phase component from the reconstructed light wave of the object light using division for every incident direction. The operation for deriving the phase adjusted reconstruction light wave $h^j/\xi^j$ is an operation for standardizing the phase of the reconstructed light wave $h^j$ for each incident direction $\theta^j$ mutually on the reconstruction plane $z=z_P$. The object light $O^j$ is a light produced by adding up each reflected light generated at each point of the object surface (for reflection type) or inside the object (for transmission type), and the phase of each reflected light is the same as that of the illumination light $Q^j$ which generates the reflected light at the position the reflected light is generated. In other words, each object light generated at each point of the object is in phase with each illumination light generating the object light at each point the object light generated. Therefore, the phase of the object light $O^j$ of each incident direction is adjusted (standardized) on the reconstruction plane $z=z_P$ by the above-described phase adjustment operation using the division.

In a light wave adding up process of the process (S7), a synthetic light wave $H_P=\Sigma h^j/\xi^j$, which is a hologram on the reconstruction plane $z=z_P$, is derived by adding up the phase adjusted reconstruction light wave $h^j/\xi^j$ for the incident directions $\theta^j$, $j=1,\ldots,N$. The addition is made for such an incident direction $\theta^j$ which is set so that the wave number kz in the direction of the z axis of each illumination light $Q^j$ might be settled in a predetermined tolerance. In other words, the hologram $I^j_{OQR}$ is acquired using a group of illumination light $Q^j$ having a deviation angle (zenith angle) to the z axis which passes through the position where an image is reconstructed, wherein the angle is within a tolerance such that any two angles in the tolerance are deemed to be the same. The addition is performed using a weighted average. For example, the reciprocal of the number of data for the addition is used as the weight (the result in this case is the average value of addition data). Since the synthetic light wave $H_P$ is equivalent to what made by synthesizing the object lights (illumination lights are also contained) which are recorded changing the direction of illumination lights, the synthetic light wave $H_P$ becomes one having a numerical aperture NA equal to the sum of a numerical aperture $NA_Q$ of the illumination lights and a numerical aperture $NA_O$ of the object lights, namely $NA=NA_Q+NA_O$. Therefore, the value of the numerical aperture NA can be equal to 1 or more than 1 (described later). The numerical aperture $NA_O$ of the object light is a numerical aperture of a recording plane, i.e., an acceptance surface of a photo-detector, used for recording the object lights.

In a light intensity calculation process of the process (S7), an image $S_P=|H_P|^2$ on the reconstruction plane $z=z_P$ is reconstructed from the synthetic light wave $H_P$. The image $S_P$ can be displayed on a monitoring display as a picture. Namely, the synthetic light wave $H_P$ is one, which is made by computer-composing the object lights using the phase information of the illumination lights after reconstructing the object lights and illumination lights from the holograms of the object lights and the illumination lights which are recorded as the holograms of large numerical aperture by changing the incident directions, and therefore, it is equivalent to a hologram in which an object light is recorded using an optical system having a numerical aperture exceeding 1. Since higher resolution is obtained with larger numerical aperture, an image of super-high-resolution exceeding the limit of the resolution of the conventional optical microscope can be reconstructed by using the synthetic light wave $H_P$ representing an object light having a numerical aperture exceeding 1.

(Detailed Explanation, the Data Acquisition Process S0: Transmission Type)

Below, each of the above-mentioned processes are explained in detail. The data acquisition process (S0) is performed using a data acquisition equipment 10 of transmission type shown in FIG. 2 and FIG. 3, for example. The off-axis hologram $I_{LR}$ is acquired by an optical system 3 shown in FIG. 2. The data acquisition equipment 10 comprises a condenser 30 which generates the in-line spherical wave reference light L, a minute ball M (for example, a metal ball, such as gold) which generates the off-axis spherical wave reference light R, a photo-detector 4 which changes light intensity of interference fringes of the reference lights L and R to an electric signal and outputs it, and a storing unit 5 which stores the output from the photo-detector 4 as a hologram. The lights L and R, which are coherent mutually, are incident on the condenser 30 and the minute ball M, respectively.

The condenser 30 is set in an in-line arrangement to the photo-detector 4. The light L which is incident on the condenser 30 is condensed at a point P supposed to be a position where an object 6 is arranged (a position where an object light to be recorded is generated), and then spreads and turns into the in-line spherical wave light L, and runs onto the photo-detector 4. The minute ball M is set in an off-axis arrangement to the photo-detector 4. The light R going onto the minute ball M spreads from the point P2, where the minute ball M is located, turns into the off-axis spherical wave light R which runs onto the photo-detector 4. Each of the reference lights L and R is generated at each of points P1, P2 (virtual point light sources) in close proximity to each other which are spherical wave light sources of them, respectively. Therefore, the reference lights L and R can generate interference fringes of low spatial frequency also on the periphery of the acceptance surface of the photo-detector 4. The acquisition of the off-axis hologram $I_{LR}$ having a large numerical aperture is accomplished by such an optical system 3.

Figure 3:
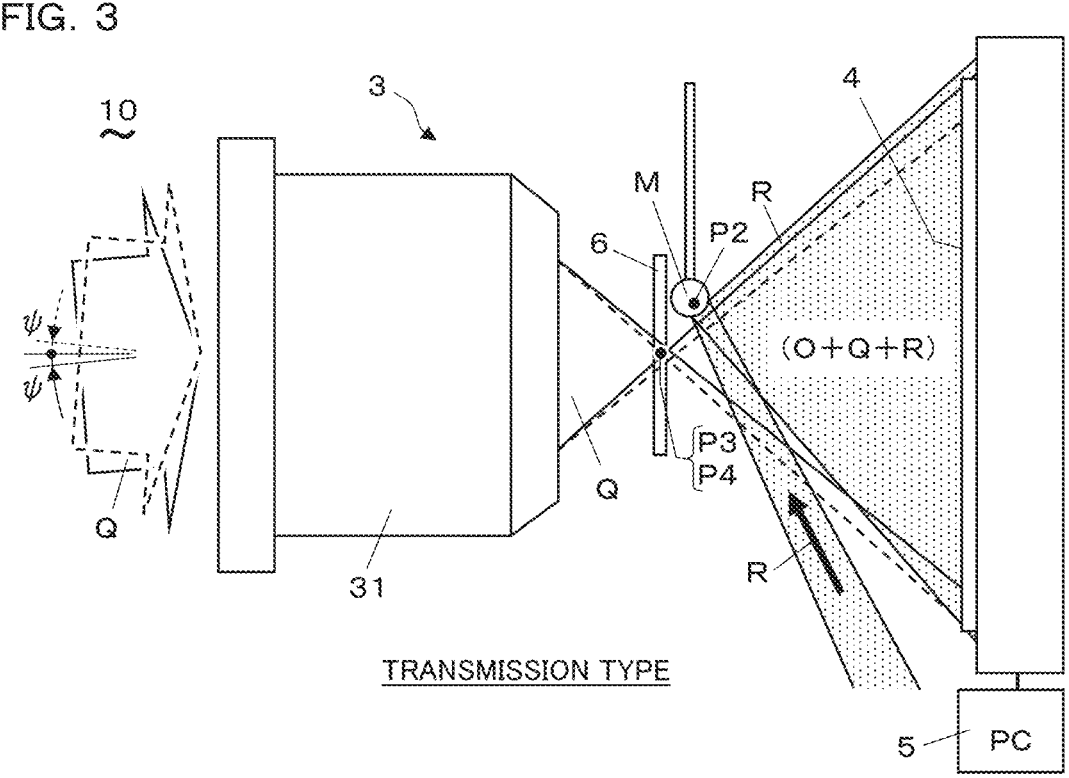
FIG. 3 is a side view of an equipment acquiring data of an object light used for the image reconstruction method.

The data of the off-axis hologram $I^j_{OQL}$ is acquired by an optical system 3 shown in FIG. 3. This optical system 3 comprises a condenser 31 for generating the spherical wave illumination light Q in place of the condenser 30 for generating the spherical wave reference light L above-mentioned. The arrangements of the minute ball M and the photo-detector 4 and the reference light R generated by those are kept strict on the same conditions with the case of FIG. 2 above-mentioned. A translucent object 6 with which a transmission image is acquired is arranged at the condensing position of the condenser 31. A light Q which has an angle ψ leaning to the optic axis of the condenser 31 is incident on the condenser 31. In order to generate the light Q of angle ψ, a reflector, which is inclinable around two mutually perpendicular axes intersecting perpendicularly to the optic axis of the lens, is arranged at the entrance side of the condenser 31. The reflector and condenser 31 constitute an angle change unit which changes an incident direction of the illumination light Q on the object. A parallel light, which has a bigger diameter than that of an entrance side opening of the condenser 31, is incident on the reflector from a direction perpendicular to the optic axis of the condenser 31. A part of the reflected light from the reflector in an inclined position enters the opening of the condenser 31 as the light Q which has the leaning angle ψ.

The light Q and the reference light R are lights coherent mutually. The light Q, after passing the condenser 31, condenses according to the size of the angle ψ at the point P3 (condensing point) apart from the optic axis position, and then spreads and turns into the illumination light Q, and runs onto the photo-detector 4. Since the illumination light Q has the condensing point P3, the light is a collection of lights propagating along various directions. Moreover, by changing the deviation angle (angle ψ) of the light Q being incident on the condenser 31, namely the angle deviating from the lens optic axis, the position of the condensing point P shifts approximately in parallel toward the direction perpendicular to the optic axis, and the incident direction of the illumination light Q which is incident on an localized region (represented with a point P4) of the object 6 illuminated with the illumination light Q changes (refer to the below-mentioned FIG. 4). The angle change unit using such bigger diameter parallel light, the reflector, and the condenser 31 can control the direction of the illumination light Q by easy equipment easily compared with an angle change unit using a thin optical beam, a diffraction grating, and so on.

The point P4 of the object 6 is illuminated with the illumination light Q, and the object light O is generated there in the shape of a spherical wave from there. The object light O, the illumination light Q transmitting the object 6, and the reference light R interfere mutually on the acceptance surface of the photo-detector 4 and generate interference fringes, and the interference fringes are recorded as the off-axis hologram $I_{OQR}$ of large numerical aperture. The off-axis hologram $I_{OQR}$ is a hologram including the information on both the object light O and the illumination light Q. Since the image reconstruction method uses the phase information on the illumination light Q for image reconstruction, it needs to take out the information on the illumination light Q from the off-axis hologram $I_{OQR}$. Then, taking advantage of the characteristic that the illumination light Q has the above-mentioned condensing point P3, the illumination light Q can be extracted at the condensing point by distinguishing that from the object light O and the reference light R which are distributed widely there.

By changing the incident conditions (the above-mentioned angle ψ etc.) of the light Q on the condenser 31, illumination lights $Q^j$, j=1, ..., N, made by changing the incident directions $\theta^j$, j=1, ..., N of the illumination light Q on the object 6 are obtained. A plurality of off-axis holograms $I^j_{OQR}$, j=1, ..., N for each incident direction are acquired using those illumination lights $Q^j$. The incident direction $\theta^j$ expresses two deviation angles (an azimuthal angle and a zenithal angle) in three-dimensional polar coordinates in vector. When the azimuthal angle is denoted by α and the zenith angle is denoted by β, the incident direction $\theta^j$ is expressed as $\theta^j=(\alpha^j, \beta^j)$. Multi directional illuminations are performed by changing the incident directions $\theta^j$. An image of an object at the position where the illumination lights from many directions concentrate is reconstructed as an image under a holographic microscope.

Identical lenses may be used or different lenses may be used for the above-mentioned condensers 30 and 31. The condensing position (point P1) with the condenser 30 and the minute ball M position (point P2) are considered to be virtual point light sources, and arranged mutually in close vicinity. Moreover, the condensing position (point P3) of the illumination light Q with the condenser 31 is also considered to be a virtual point light source, and the vicinity of the point P3 is the generating position of the object light O (localized region, point P4). Those points P1-P4 are made to be in close vicinity condition mutually. Thereby, it is possible to acquire holograms of large numerical aperture and to use them for image reconstruction. On the contrary, what is necessary is just to constitute such an optical system 3 so that holograms of large numerical aperture can be acquired and image reconstruction can be performed.

Conditions for the spatial relationship between the points P2-P4 are shown. An angle χ is defined as an angle between a line from an arbitrary point, which is on the acceptance surface of the photo-detector for recording holograms, to the point P2 and a line from the arbitrary point to the point P4, and a pixel interval d of a photo-detector and a wavelength λ of a light are also defined. A condition to enable an observation of interference fringes made by the object light O and the reference light R on the photo-detector is χ<λ/(2d), because it is necessary that the interval of interference fringes should become more than twice the pixel interval d. A condition of the off-axis how much off-axis should be done for the reference light R is determined from a condition to make separable the object light O and reference light R by Fourier-transforming the hologram in which an object light O and a reference light R are recorded. The condition that the point P2 can be arranged is determined by those.

(On Large Aperture Spherical Wave Reference Lights R and L)

A reference light R of large numerical aperture is indispensable for recording an object light of large numerical aperture as a hologram. If the reference light R is generated using a condenser, for example, without using the above-mentioned minute ball M, a half mirror will be needed in order to overlap the object light O and the reference light R mutually, and it will become difficult to record an object light of such a large numerical aperture close to one because of half mirror usage. In this embodiment, complex amplitude in-line hologram $J_{OQL}$ is obtained by division process using two off-axis holograms $I_{LR}$, and $I_{OQR}$. By the process, the reference lights R are balanced out each other and do not appear in $J_{OQL}$. Therefore, if the off-axis holograms $I_{LR}$ and $I_{OQR}$ are obtained, exact space distribution of the reference light R is not necessary to be known. On the other hand, the in-line reference light L is a light wave to be a standard or basis in object light recording, and a spherical wave is used as the reference light L because the space distribution can be obtained correctly.

In this embodiment, a minute ball M of about tens of ms in radius is irradiated with a thin optical beam, and the beam is reflected as a large numerical aperture light from it, and then the light is used as the off-axis reference light R. A half mirror is dispensable by usage of the minute ball M and the numerical aperture of recorded object light can be enlarged close to one. On the other hand, a parallel light is fed into a condenser of large numerical aperture and a highly precise large numerical aperture spherical wave is generated, which is used as the in-line spherical wave reference light L. The spherical wave reference light L is recorded as an off-axis hologram $I_{LR}$ using the reflected light from the minute ball M as the reference light R.

The minute ball M can generate the off-axis spherical wave reference light R, without occupying big space unlike a condenser. The minute ball M generates a spherical wave from a beam-like light by reflection of light on the minute sphere of convex shape. A spherical wave may be generated from a beam-like light by reflection of light on the minute sphere of concave shape in place of the minute ball M. Moreover, in place of the beam-like light and the minute sphere, a condensing light and a small plane reflector may be used to generate the off-axis spherical wave reference light R by making the light reflect near the condensing position. In addition, while acquiring each of the off-axis holograms $I^j_{OQR}$, j=1, . . . , N, it is necessary to maintain the optical conditions of the off-axis spherical wave reference light R with which the off-axis hologram $I_{LR}$ of the in-line spherical wave reference light L is acquired.

(Illumination Light Q)

If a light which condenses at a position other than observing point in an object is used as the illumination light Q, the illumination light Q reconstructed from a hologram will condense in a shape of a spot at the position. On the other hand, the object light O reconstructed from the hologram propagates the the position, where the illumination light Q is condensing, in a spread state. Using the condensing nature of the illumination light Q, it is possible to derive the object light O and the illumination light Q in separate effectively. The illumination light Q is prepared as condensing or condensed light by condensing a parallel light into a shape of spot using a large numerical aperture condenser, and used to illuminate the object 6. The direction of the illumination light Q can be changed by various methods. Since the propagation direction of an illumination light having condensing nature changes along with the displacement in the transverse direction, the direction of the illumination light in a certain position can be easily changed only by moving the illumination light Q to a transverse direction a little. As mentioned above, the incident direction of the illumination light Q to the object can be changed easily, because it is possible to move the position of illumination light by changing the direction of the parallel light which is incident on the condenser 31.

Figure 4A:
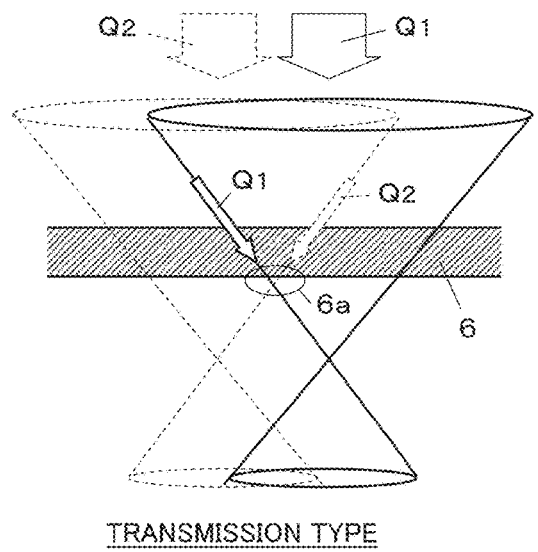
FIG. 4A and FIG. 4B are the principal part sectional views of FIG. 3.
Figure 4B:
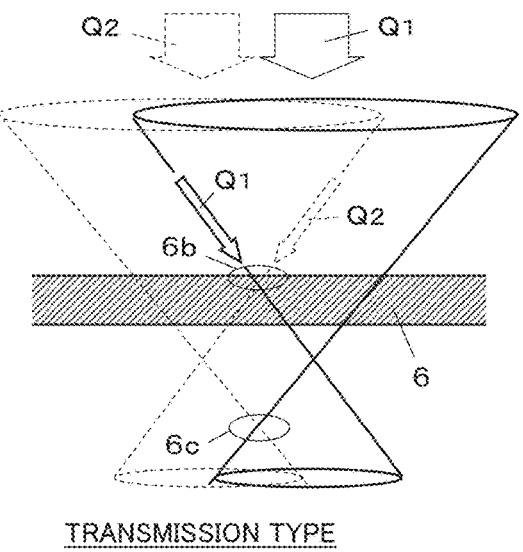

FIGS. 4A and 4B show the situation of multi-directional illuminations and generation of object lights using the optical system 3 in above-mentioned FIG. 3. As shown in FIG. 4A, when an illumination light condensing to reverse conical shape is translated, each of the illumination lights Q1 and Q2, which is along each of generatrices of the translated cones made by the illumination light, is incident on an area 6a on the bottom surface of the object 6, with a mutually opposite incident direction. Here, the illumination light condensing in cone shape from parallel light is a set of countless conic lights which share a vertex and have the same axle and different apex angles. The illumination lights Q1 and Q2 are the lights along generatrices of each of the cones which are made by translating the cone of the same apex angle and the same generatices. A reconstructed image using a hologram data based on those illumination lights Q1, Q2, etc. is clearest in the area 6a, and a high-resolution image is obtained there. Moreover, since the inside of the thickness of the object 6 above the area 6a is also illuminated with the illumination lights Q1, Q2, etc. of incident angles changed in a similar manner mutually and object lights are generated, images of the inside of the thickness can be reconstructed and observed by changing the reconstruction conditions for images.

Moreover, in the case of FIG. 4B the illumination lights Q1 and Q2 are concentrating into an area 6b on the upper surface of the object 6, and if an image is reconstructed based on those illumination lights Q1, Q2, etc., a clearest and high-resolution image is obtained in the area 6b. However, since the lower part of the area 6b in the object 6 is not illuminated at all by the illumination lights Q1 and Q2 and any object light is generated there, an image of those parts cannot be observed even if the image is reconstructed. By changing reconstruction conditions, images having changed relative spatial relationships between the object 6 and its illuminated position with the illumination lights can be reconstructed, and also an observing position can be selected. Moreover, by changing the conditions for acquiring holograms, it is possible to set up a relative position of the object 6 so that the area 6c in the figure becomes an observation area. Furthermore, by translating the position of the area 6a or the area 6b and acquiring holograms at each translated position, a large reconstructed image scanned on the object 6 can be generated.

Figure 5:
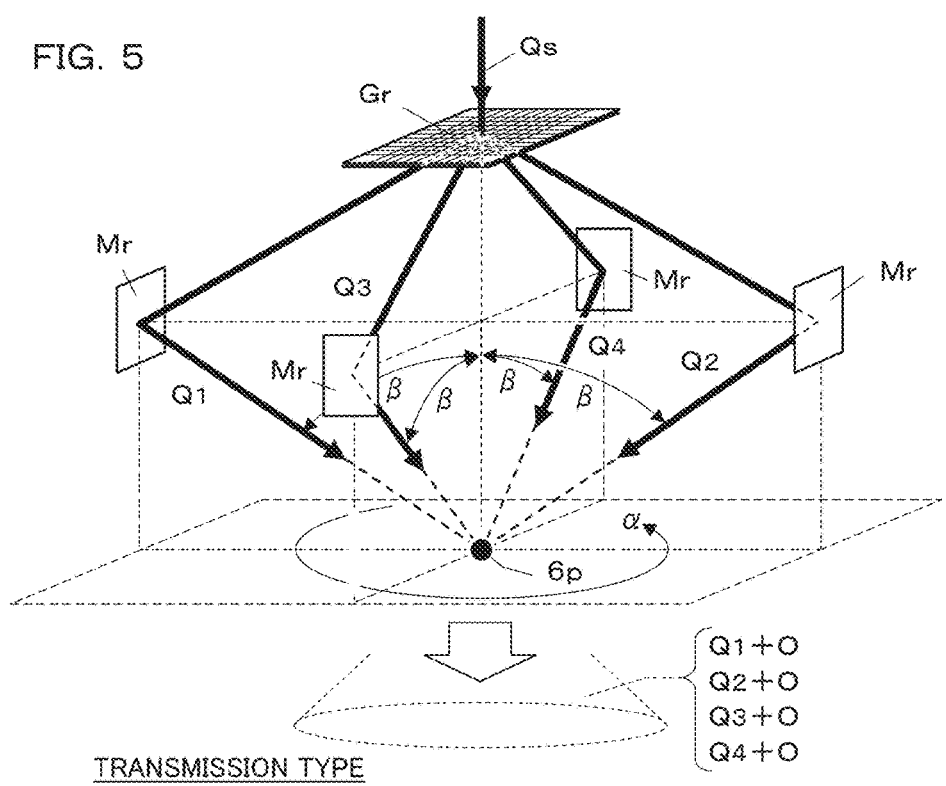
FIG. 5 is a perspective diagram showing another example of a multi-direction lighting used for the image reconstruction method.

FIG. 5 shows an example of generating illumination lights of thin beams coming from multiple directions. This optical system (angle change unit) is equipped with a diffraction element Gr which has diffraction gratings formed in mutually orthogonal directions in a plane, and four reflectors Mr which are arranged at four sides of a rectangle to face each other and to surround the normal direction axis of the diffraction element Gr. When a light source light Qs is incident on the diffraction element Gr vertically, four primary diffraction lights Q1-Q4 and one 0th diffraction light are generated. The 0th diffraction light passing the diffraction element Gr and going straight on is intercepted with a closure plate. The diffraction lights Q1-Q4 are reflected by the reflectors Mr. According to the optical system, all the diffraction lights Q1-Q4 can be set up symmetrically to pass one point 6p. By arranging an object at the position of the point 6p, the object can be illuminated from four directions, using the diffraction lights Q1-Q4 as illumination lights Q1-Q4. The illumination lights Q1-Q4 are lights from incident directions $\theta^j$, j=1-4, the deviation angles (azimuthal angle $\alpha$) of which are in a 90-degree interval mutually around the normal direction axis passing the point 6p and have the same zenith angle $\beta$ of each other. Moreover, this constitution is applicable to realize the optical system 3 of above-mentioned FIG. 3 by making the light source light Qs be a thick parallel light and by making the position of the point 6p be at the position of the entrance side opening of the condenser. The diffraction element Gr may also be of one diffraction grating formed only in one direction in a plane. In this case, the diffraction element Gr is rotated one by one around its normal direction axis, and illumination lights from incident direction $\theta^j$ having arbitrary azimuthal angle $\alpha^j$ can be generated.

Figure 6A:
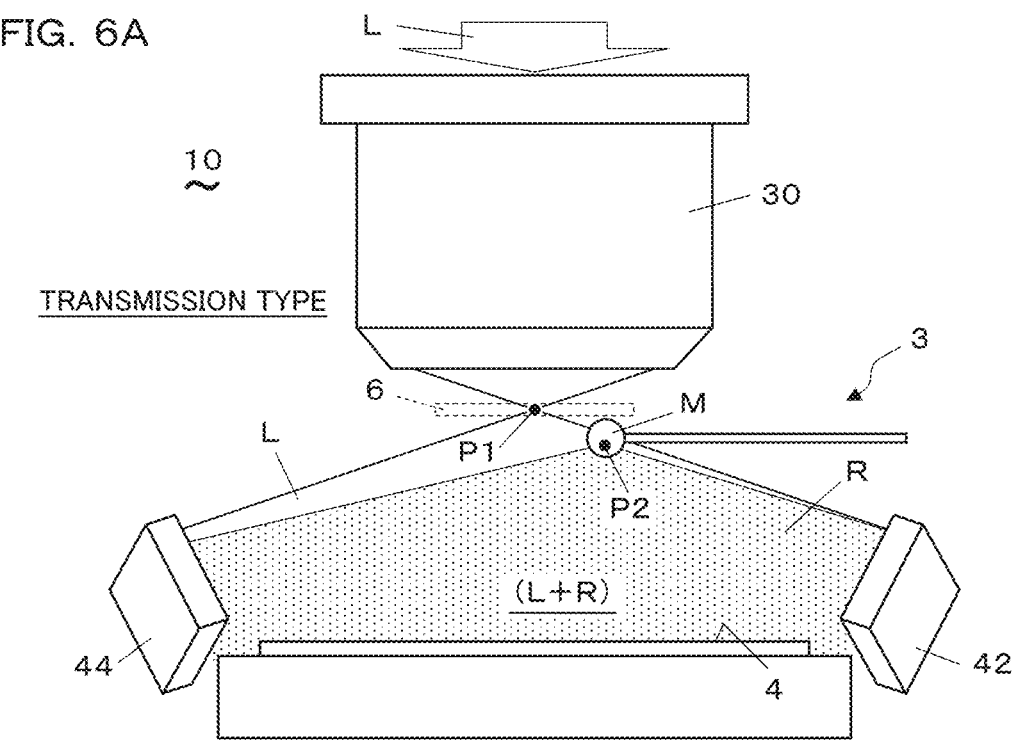
FIG. 6A is a side view of another example of a transmission type equipment acquiring data of an in-line spherical wave reference light used for the image reconstruction method.
Figure 6B:
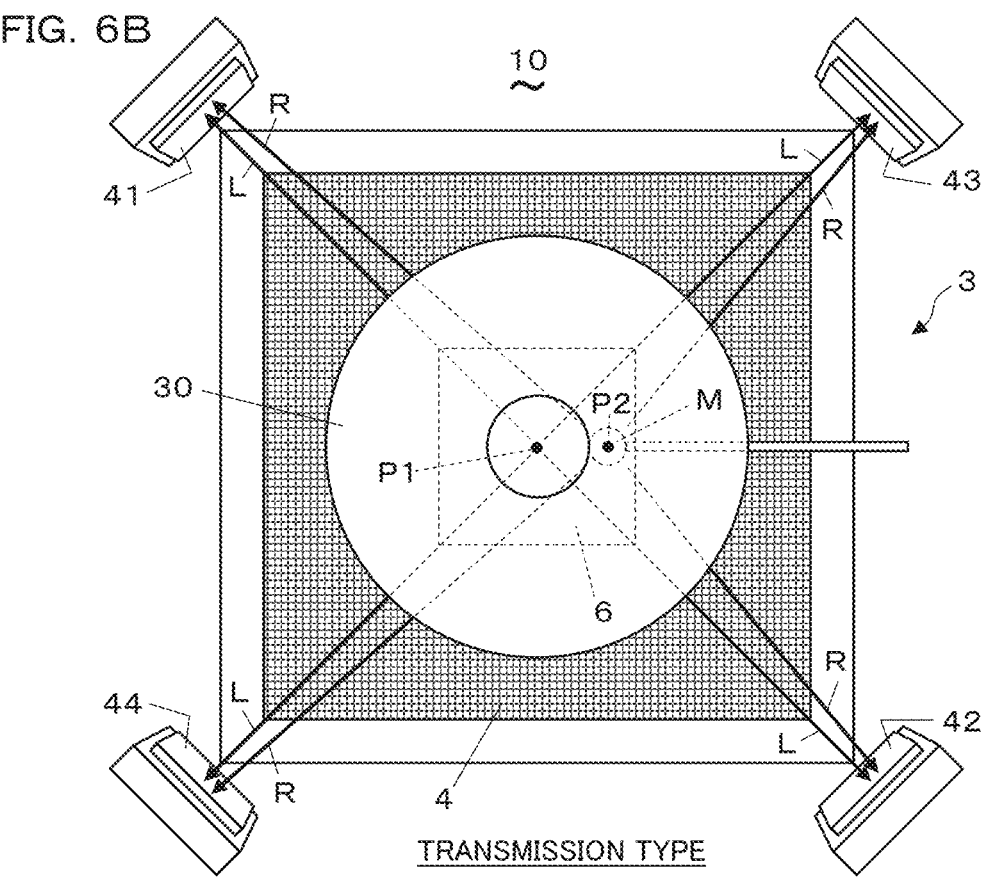
FIG. 6B is a plan view of the equipment.

FIG. 6 and FIG. 7 show a data acquisition equipment 10, for which the optical system of above-mentioned FIG. 5 is adapted. The relation between FIG. 6 and FIG. 7 is correspond with the relation between above-mentioned FIG. 2 and FIG. 3. Data of the off-axis hologram $I_{LR}$ of the in-line spherical wave reference light L is acquired by the optical system 3 of the data acquisition equipment 10 shown in FIGS. 6A and 6B. The data acquisition equipment 10 is equipped with four photo-detectors 41-44 at four corners of the photo-detector 4 other than the photo-detector 4 so that holograms of the illumination lights Q1-Q4 from four directions in diagonal mutually can be acquired.

The in-line spherical wave reference light L is generated by the condenser 30 which has the condensing point P1. Each photo-detector 4, 41-44 is arranged so that the point P1 may be located on their optic axes, i.e., the axis of the normal direction passing through the center of each photo-detector, and they are in in-line arrangement to the reference light L. The reference light R is generated with the minute ball M at the point P2 position. The points P1 and P2 are arranged closely each other. The reference lights L and R have a large numerical aperture which can irradiate each acceptance surface of the photo-detectors 4, 41-44. Holograms $I_{LR}$ of the reference light L, which enters each photo-detector 4, 41-44, are acquired for each photo-detector 4, 41-44. When a lens of large numerical aperture cannot be obtained for the condenser 30, a pinhole with a diameter below the wavelength of the light should just be arranged at the point P1 to make the numerical aperture of the reference light L close to 1. The pinhole can be made with lithography of metal thin film on a glass, for example. The numerical aperture of the reference light L can be brought close to 1 according to the diffraction effect of the pinhole.

Figure 7A:
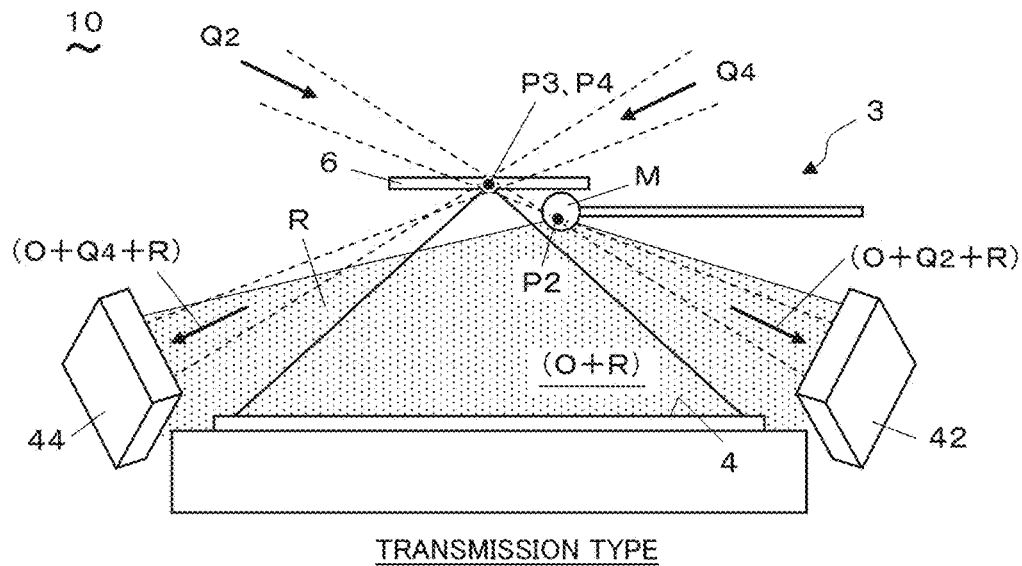
FIG. 7A is a side view of the equipment acquiring data of an object light used for the image reconstruction method.
Figure 7B:
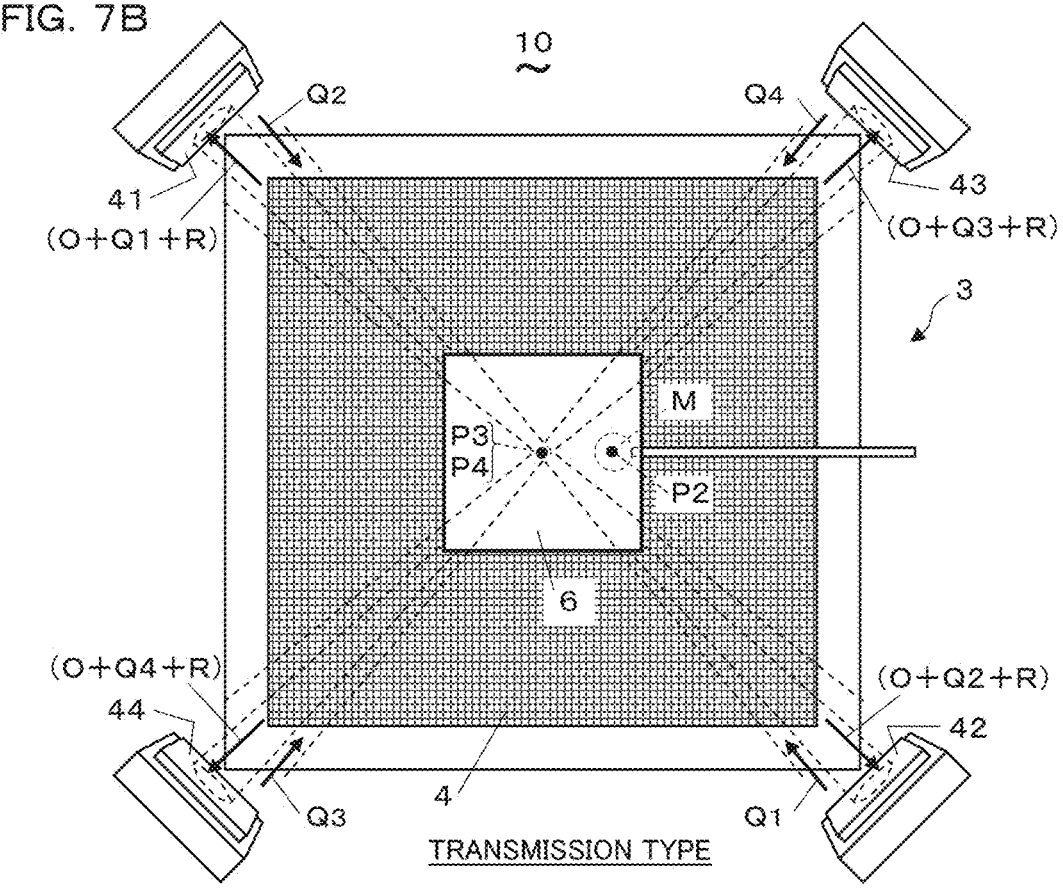
FIG. 7B is a plan view of the equipment.

Data of the off-axis holograms $I^j_{OQR}$, $I^j_{QR}$, j=1-4, in which the object light O and the illumination light Q are recorded, respectively, are acquired by the optical system 3 of the data acquisition equipment 10 shown in FIGS. 7A and 7B. In this case, for example, if the object 6 is illuminated with the illumination light Q1, the hologram $I^1_{OQR}$ of the object light O1 and the illumination light Q1 about the incident direction $\theta^j$ (j=1) is acquired with the photo-detector 4, and the hologram $I^1_{QR}$ of the illumination light Q1 is simultaneously acquired with the photo-detector 41. The hologram $I^1_{QR}$ of the illumination light Q1 is for acquiring the information on the illumination light Q1, however, the object light O1 is usually mixing into the hologram $I^1_{QR}$. Then, each illumination light Q is generated using a thin beam having a condensing point so that the beam can condense after transmitting the object 6 and then spread, as the light source light Qs in above-mentioned FIG. 5, for example. By using the illumination light Q having such a condensing point, it is possible to distinguish the illumination light Q at the condensing point from the object light O and the reference light R which are distributed widely and possible to extract the illumination light Q from the hologram data through post-processing. Moreover, the hologram $I^j_{OQR}$ of the object light $O^j$ and the illumination light $Q^j$ can be made as a hologram which does not contain the illumination light $Q^j$ substantially by using a thin beam for the light source light Qs.

(Data Acquisition Process S0: Reflection Type)

Figure 8A:
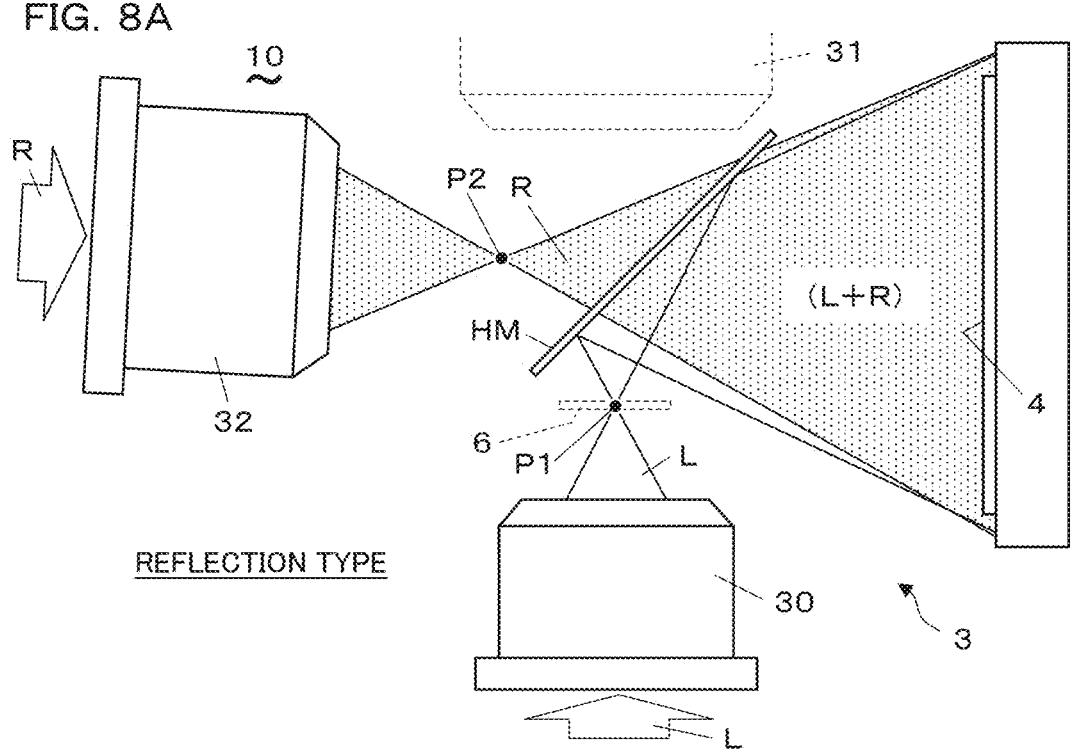
FIG. 8A is a side view of a reflection type equipment acquiring data of in-line spherical wave reference light used for the image reconstruction method.
Figure 8B:
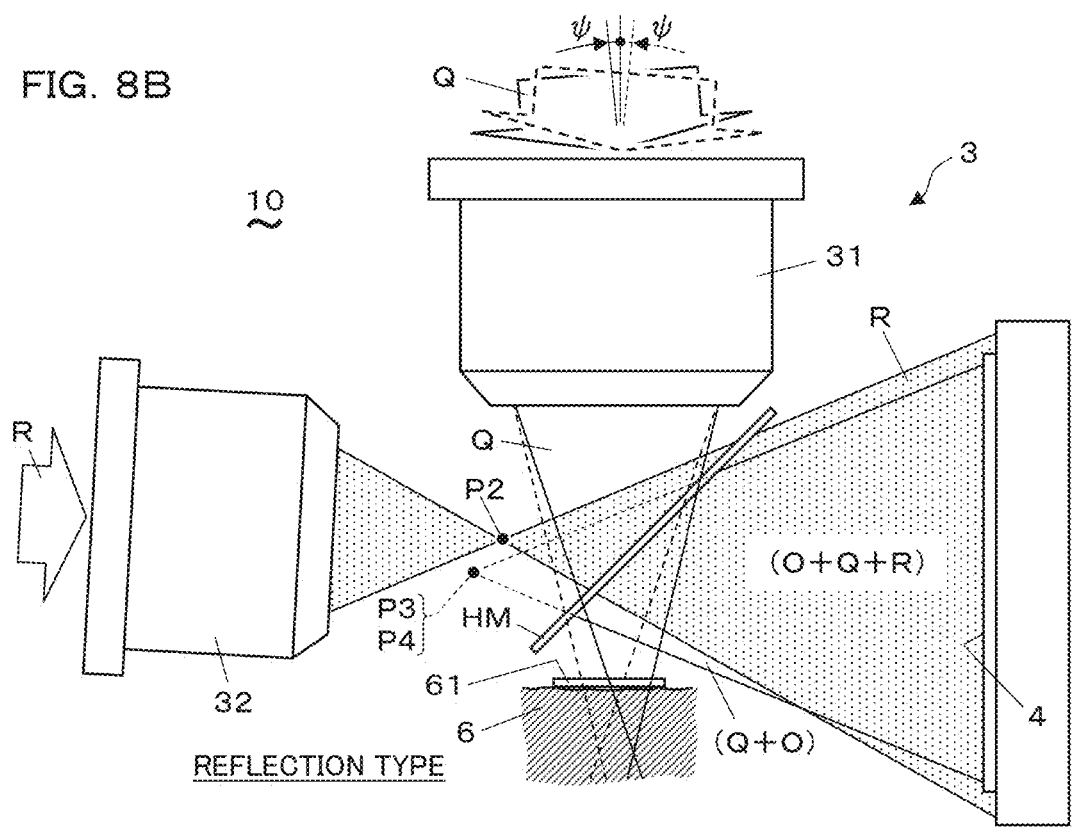
FIG. 8B is a side view of the equipment acquiring data of an object light.

FIGS. 8A and 8B show a data acquisition equipment 10 of a reflection type holographic microscope. The data of the off-axis hologram $I_{LR}$ is acquired by an optical system 3 shown in FIG. 8A. The optical system 3 is equipped with a half mirror HM arranged at the front of the photo-detector 4, a condenser 30 which makes the in-line spherical wave reference light L reflect by the half mirror HM and illuminate the photo-detector 4, and a condenser 32 which makes the off-axis spherical wave reference light R go through the half mirror HM and illuminate the photo-detector 4. It is assumed that the object 6 is arranged near the condensing point P1 of the reference light L, and it is assumed that the condenser 31 for the illumination light is arranged at the position opposite to the condenser 30. Each position of the condensing point P1, P2 of the reference light L and the reference light R and a position of the originating point of the object light from the object 6 are arranged closely each other. Thereby, acquisition of a hologram of large numerical aperture is achieved. In addition, the in-line spherical wave reference light L is used as a standard light in the holographic image processing. Therefore, the optical system 3 has a constitution that the reference light L does not pass the half mirror HM so that turbulence may not be given to the reference light L.

The data of the off-axis hologram $I_{OQR}$ is acquired by an optical system 3 shown in FIG. 8B. In this optical system 3, the object 6 is arranged at the position of the above-mentioned condenser 30, and the condenser 31 for the illumination light Q is arranged at the position facing the object 6 beyond the half mirror HM. On the object 6, a cover glass 61 for reflecting a part of the illumination light Q is arranged. The incident direction of the illumination light Q for illuminating the object 6 can be changed by swinging the light Q, which is incident on the condenser 31, right and left as shown with angle $\psi$ or more generally in precession movement. The localized common region illuminated with the illumination light Q of each incident direction is the attention area (observation area) where an image is obtained and reconstructed. The object light O enters the photo-detector 4 after reflected by the half mirror HM. A part of the illumination light Q is incident on the photo-detector 4 after reflected by the cover glass 61. The object light O and the illumination light Q arriving at the photo-detector 4 are recorded using the reference light R as the common off-axis hologram $I_{OQR}$ having a large numerical aperture. The off-axis spherical wave reference light R is maintained while acquiring those holograms in an optical condition with which the off-axis hologram $I_{LR}$ of the reference light L is acquired.

The cover glass 61 is used in order to reconstruct the illumination light Q correctly. With respect to the degree of flatness of the cover glass 61, the concavo-convex change of its surface is set below around the wavelength λ of the illumination light Q. Data of the illumination light Q obtained by the reflection is processed in data processing so that the illumination light settles at the position where the object light O has generated. That is, the illumination light Q is made to propagate back to the reflected position at the cover glass 61, and further made to propagate inside the cover glass 61 with taking the refractive index of the medium into consideration along the direction which is a direction that the original illumination light propagates along it.

The information on the illumination light Q is acquirable as an off-axis hologram $I^j_{OQR}$ independently using a light control mirror device based on the principle of photochromism, for example, in place of the cover glass 61. Thereby, without operating the arrangement of the cover glass 61 or the object 6, the reflection and the transmission can be changed electrically using the light control mirror device, and only the reflected light of the illumination light Q can be recorded efficiently and separately from the object light O. In this case, the processing for extracting the information on the illumination light Q from the off-axis hologram $I^j_{OQR}$ becomes unnecessary. Moreover, in combination with the method of using the below-mentioned polarization and a polarizing plate, it is possible to record the object light O efficiently and separately from the illumination light Q. Moreover, it is desirable to prepare a mask on the upper surface of the cover glass 61, which is formed using a metal vapor deposition film layer etc. not allowing light to pass, for example and which has an opening. The opening of the mask is made, for example, in a restricted size which can limit the observation area of the object 6 and can pass the illumination light Q. With such a mask, turbulence lights (background light), such as multiple reflection light generated in the inside and the non-observing area of the object 6, can be prevented from entering the photo-detector 4, and a high quality hologram can be acquired.

Figure 9A:
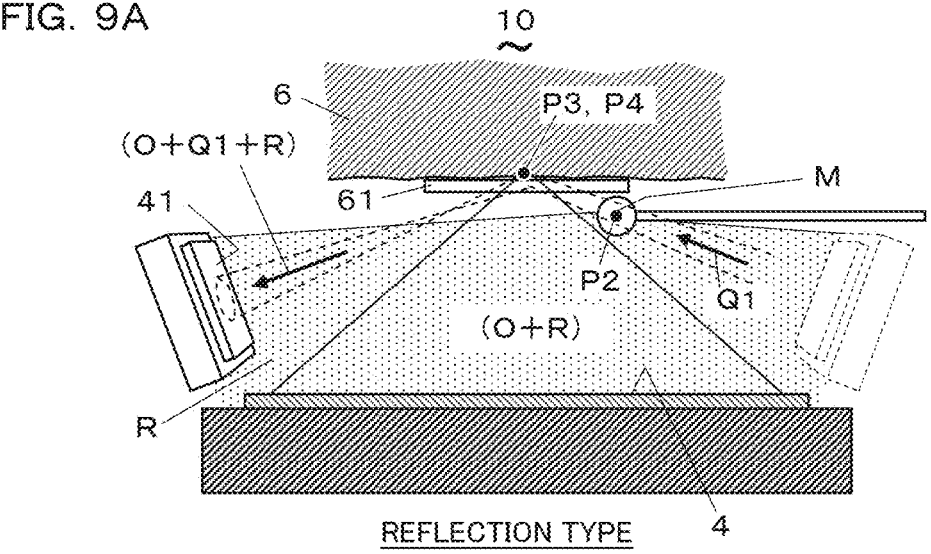
FIG. 9A is a side view showing another example of a reflection type equipment acquiring data of an object light used for the image reconstruction method.
Figure 9B:
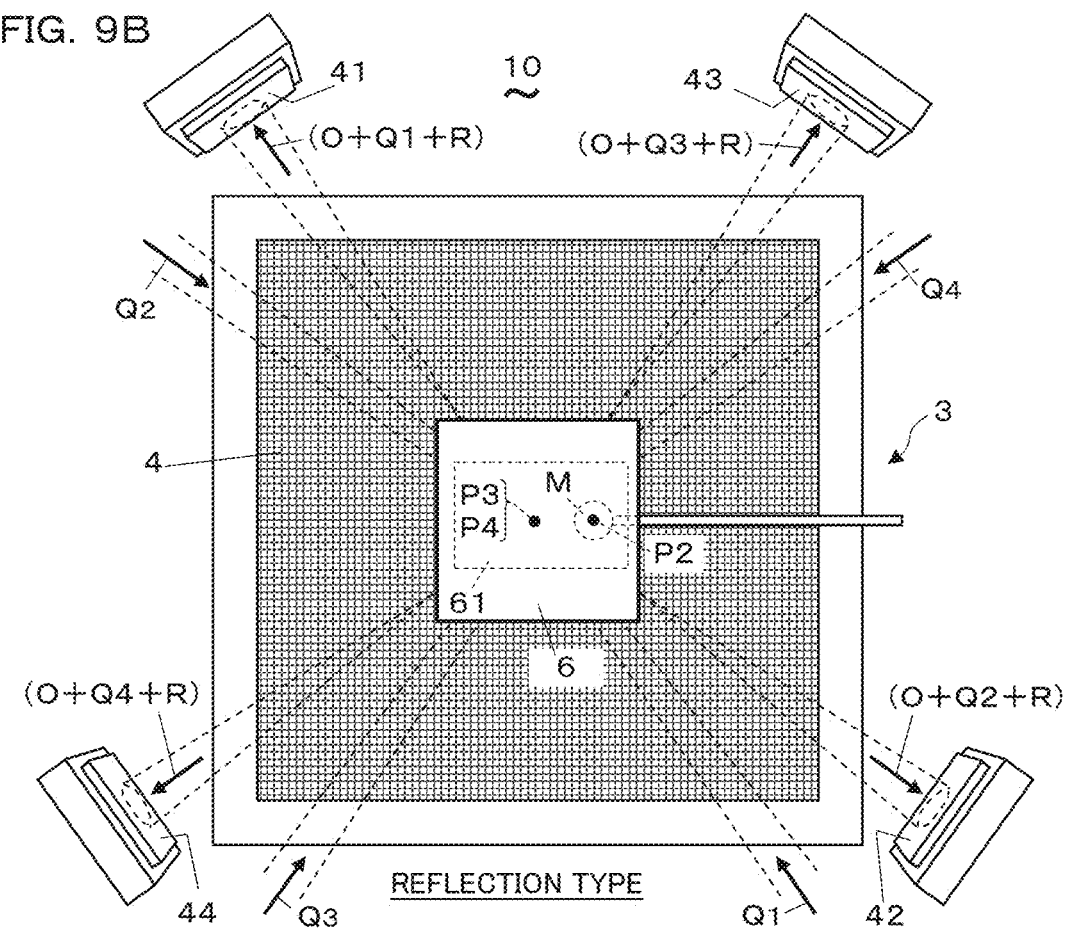
FIG. 9B is a plan view of the equipment.

FIGS. 9A and 9B show a data acquisition equipment 10 of the reflection type in the case of using illumination lights Q of thin beam coming from multiple directions. The object 6 is arranged facing the photo-detector 4, and the cover glass 61 for reflecting a part of the illumination lights Q is arranged on the surface of the object 6. The optical system 3 of this reflection type data acquisition equipment 10 is constituted to make the illumination lights Q1-Q4, shown for the transmission type optical system 3 in above-mentioned FIGS. 6A, 6B, and FIGS. 7A and 7B, be incident on the surface of the object 6 from the side direction of the photo-detector 4. With the photo-detector 4, holograms $I^j_{OQR}$, j=1-4 of the object light O and the illumination light Q using the illumination lights Q1-Q4 are acquired. The hologram $I^j_{OQR}$ can be made as holograms which do not contain the illumination light $Q^j$ substantially.

With the photo-detectors 41-44 arranged around the photo-detector 4, the data of the holograms $I^j_{QR}$, j=1-4 of the illumination lights Q1-Q4 are acquired. An object light $O^j$ is incident on each photo-detector 41-44 in addition to the reference light R and the illumination lights Q1-Q4. Then, it is made easy to extract information on the illumination light $Q^j$ from the hologram $I^j_{OQR}$ by using the illumination light having a condensing point so that the light can condense after reflecting with the cover glass 61. Moreover, in order to record the illumination light Q independently, the holograms $I^j_{QR}$, j=1-4 of the illumination lights Q1-Q4 may be acquired using the light control mirror device based on the principle of photochromism, in place of the cover glass 61.

(Details of the Process (S1 to S7) of Image Reconstruction)

Herefrom, data processing of a hologram, etc. are explained using mathematical expression. Coefficients, arguments, subscripts, and so on, in each equation are recognized to be in a general expression and meaning. Moreover, in each following equation, an explicit description of the coordinate (x, y), subscript j which distinguishes each of incident directions $\theta^j$, j=1, . . . , N, etc. are omitted appropriately. In acquisition of holograms and reconstruction of images, reference lights R, L, an object light O, an illumination light Q, a mixed light of the object light O and the illumination light Q, etc. participate. In addition, the mixed light of the object light O and the illumination light Q is denoted as a mixed light T, for mathematical expression convenience. Similarly, the expression for each of holograms relating such a mixed light is denoted by appropriately changing the expression as $I_{OQR}$ to $I_{TR}$, $J_{OQR}$ to $J_{TR}$, and $J_{OQL}$ to $J_{TL}$, (namely, $I_{OQR}=I_{TR}$, $J_{OQR}=J_{TR}$, and $J_{OQL}=J_{TL}$).

Then, using a coordinate (x, y) system on the light receiving surface (which is assumed to be a plane) of the photo-detector 4, the reference lights R (x, y, t), L (x, y, t), and the mixed light T (x, y, t) are denoted by following equations (1) to (3), in a general form, respectively. Those lights are mutually coherent lights of angle an frequency ω. Light intensity $I_{LR}$ (x, y), $I_{OR}$ (x, y), and $I_{QR}$ (x, y) of the interference fringes on the surface of the photo-detector 4 are denoted by following equations (4) and (5), and these are recorded as holograms.

$$R(x,y,t)=R_0(x,y)\exp[i(\varphi_R(x,y)-\omega t)] \quad (1)$$

$$L(x,y,t)=L_0(x,y)\exp[i(\varphi_L(x,y)-\omega t)] \quad (2)$$

$$T(x,y,t)=T_0(x,y)\exp[i(\varphi_T(x,y)-\omega t)] \quad (3)$$

$$I_{LR}(x,y)=L_0^2+R_0^2+L_0R_0\exp[i(\varphi_L-\varphi_R)]+L_0R_0\exp[-i(\varphi_L-\varphi_R)] \quad (4)$$

$$I_{TR}(x,y)=T_0^2+R_0^2+T_0R_0\exp[i(\varphi_T-\varphi_R)]+T_0R_0\exp[-i(\varphi_T-\varphi_R)] \quad (5)$$

(Filtering Process S1, S2)

By applying a spatial frequency filtering to above equations (4) and (5), only the 3rd terms of the right-hand side of the equations are extracted. The spatial frequency filtering is performed by Fourier transform which changes each of above equations (4) and (5) into a spatial frequency space expression, by filtering with a bandpass filter, and by subsequent inverse Fourier transform. According to this process, a complex amplitude hologram $J_{LR}$ in which the reference light R is recorded and a complex amplitude hologram $J_{TR}$ (=$J_{OQR}$) in which the mixed light T is recorded are obtained as shown in following equations (6) and (7), respectively. Each of those is an off-axis hologram. By using spherical waves as the reference lights R and L, it becomes easy especially to separate a direct image component from a light intensity component and a conjugate image component in the spatial frequency space. In addition, if the pixels in the photo-detector 4 are supposed to be in two-dimensional arrangement with a pixel pitch d in both direction, the maximum spatial frequency of a hologram which can be recorded using the photo-detector 4 is $f_s=1/d$.

$$J_{LR}=L_0R_0\exp[i(\varphi_L-\varphi_R)] \quad (6)$$

$$J_{TR}=T_0R_0\exp[i(\varphi_T-\varphi_R)] \quad (7)$$

(Make-in-Line Modulation Process S3)

The amplitude $R_0$ and phase $\varphi_R$ of the reference light R can be removed from equations (6) and (7) by dividing $J_{TR}$ by $J_{LR}$. By this division process, a complex amplitude hologram $J_{TL}$ of the mixed light T, which is used for image reconstruction, is obtained as shown in following equation (8). This division process is a process of a space heterodyne modulation, a process of intensity, and also a process which removes the component (both intensity and phase) of the reference light R from the off-axis complex amplitude hologram $J_{TR}$. Although it has not appeared in the mathematical expression, the $J_{TL}$ turns into an complex amplitude in-line hologram $J_{TL}$ (=$J_{OQL}$), and it serves as a hologram having a large numerical aperture, because the reference light R is an off-axis spherical wave reference light R and the reference light L is an in-line spherical wave reference light L.

$$J_{TL}=(T_0/L_0)\exp[i((\varphi_T-\varphi_L)] \tag{8}$$

(Illumination Light Separation Process S4)

In the illumination light separation process (S4), a space heterodyne modulation is done to the complex amplitude in-line hologram $J_{TL}$ containing the object light O using the phase $\varphi_L$ of the in-line spherical wave reference light L, and a light wave g on a reconstruction plane z=0 is generated. Then, the above-mentioned light wave g is propagated to a specific reconstruction plane z=$z_S$. And then, an object light reconstructed light wave h, which is a reconstructed light wave of the object light O and the illumination light Q on the specific reconstruction plane z=$z_S$, is generated from the complex amplitude in-line hologram $J_{TL}$. The reconstructed light wave h contains the object light O and the illumination light Q. From the reconstructed light wave h, a reconstructed light wave c of the illumination light Q is extracted in separate. The specific reconstruction plane z=$z_S$ is such a reconstruction plane where the light wave of the illumination light Q in the mixed light T is localized and the object light O spreads, and therefore a position of the condensing point of the illumination light Q is chosen for it.

For use in the space heterodyne modulation, the phase $\varphi_L(x, y)$ of the in-line spherical wave reference light L on the light receiving surface of the photo-detector 4 is obtained in a form of functional expression using the fact that the light is a spherical wave. The space heterodyne modulation using the phase $\varphi_L$ is carried out by multiplying above equation (8) by $\exp(i\varphi_L(x, y))$. As the result of the space heterodyne modulation, a complex amplitude in-line hologram g(x, y) of the mixed light T shown in following equation (9) is obtained. This complex amplitude in-line hologram g (x, y) corresponds to the light wave g on the above-mentioned reconstruction plane z=0, and, below, this hologram is called the light wave g (x, y) or the light wave g. The in-line spherical wave reference light L is bearing the role important as a standard light which removes the component (both intensity and phase) of the reference light R from the off-axis complex amplitude hologram, also removes its own phase, and in this way derives an in-line hologram from from an off-axis hologram. Moreover, since a phase $\varphi_L$ (x, y) of a spherical wave can be obtained correctly mathematically, the light wave g (x, y) obtained will become exact mathematically.

$$g(x,y)=(T_0(x,y)/L_0(x,y))\exp(i\varphi_T(x,y)) \tag{9}$$

The light wave g (x, y) expresses a wave front of the mixed light T on the light receiving surface of the photo-detector 4, namely, a light wave distribution of the mixed light at z=0, where z axis is defined in the normal direction of the light receiving surface of the photo-detector 4 and the position of the light receiving surface is set to z=0. The light wave g (x, y) is one which records the lights from a localized region (light source of the object light) as the candidate for observation under the holographic microscope, and its spatial frequency becomes larger as it goes off from the center of the plane acceptance surface, and becomes the maximum at the edge of the acceptance surface, like the Newton rings for a convex lens. As the numerical aperture becomes larger, the spatial frequency range of the light wave g (x, y) describing the mixed light becomes wider. By acquiring a hologram of a large numerical aperture using the spherical wave reference lights R and L each of which has a localized virtual point light source near the object light, the spatial frequency range in the hologram can be made narrower than the case where a plane wave reference light is used. When an opening half angle of the photo-detector is $\theta_{NA}$, then NA=$\sin\theta_{NA}$, and an interval of the interference fringes at an opening end becomes $\lambda/\sin\theta_{NA}$, namely, $\lambda$/NA. Therefore, using the numerical aperture NA of the hologram and the light wavelength $\lambda$, the maximum spatial frequency of the light wave g (x, y) is NA/$\lambda$.

(Plane Wave Expansion)

A light wave (wave front) at an arbitrary position on the z axis can be reconstructed from the light wave g(x, y) on the light receiving surface using a plane wave expansion method as shown below. In the plane wave expansion method, a transformed function G is obtained as a result of Fourier-transform of the light wave g, and the mixed light O is reconstructed by superposing plane waves using the transformed function G and spatial frequencies (u, v, w) which satisfy the dispersion relation of plane waves. A spherical wave and a plane wave are strict solutions of the Helmholtz equation of electromagnetic waves. Expanding the holograms in which the mixed light T, the object light O and the illumination light Q are recorded using the plane waves of the strict solutions, exact light wave fronts of those lights can be reconstructed. Then, first, g(x, y) of above equation (9) is Fourier-transformed, and the transformed function G at z=0 is obtained as shown in following equation (10). The transformed function G is a spatial frequency spectrum of the mixed light T.

$$G(u,v)=\iint g(x,y)\exp[-i2\pi(ux+vy)]dxdy \tag{10}$$

Next, using the spatial frequencies (u, v, w) which satisfy the dispersion relation of plane waves and the above-mentioned transformed function G, a light waves h(x, y) of the mixed light T on a xy plane at z=$z_S$ is reconstructed, as shown in following equation (11). The reconstructed light wave h(x, y) can be obtained by superposing plane waves weighted with the transformed function G being the spatial frequency spectrum of the mixed light T. Since the value $z_S$ can be any value, $z_S$ is taken as a position (value) where it is easy to separate the light wave c of the illumination light from the light wave h (x, y). Here, u and v in (u, v, w) are the spatial frequencies in x and y directions, respectively, and the spatial frequency w in z direction can be obtained from the dispersion equation of a plane wave, as shown in following equation (12). In equation (12), $\lambda$ is a light wavelength, and n is a refractive index of the light on the light path. The light wave h(x, y) of equation (11) is a strict solution of the Helmholtz equation which corresponds to the light wave g(x, y) as a boundary condition on the acceptance surface of the photo-detector 4.

$$h(x,y)=\iint G(u,v)\exp[i2\pi w(u,v)z_S]\exp[i2\pi(ux+vy)]dudv \tag{11}$$

$$w(u,v)=\sqrt{(n/\lambda)^2-u^2-v^2} \tag{12}$$

The the light wave h(x, y) of equation (11) can be seen as a distortion-less image by displaying light intensity for every each pixel obtained by squaring the absolute value, namely |h(x,y)|$^2$, on an electronic display. A region where the intensity in such a image is big can be specified as the region where the illumination light Q exists. The light wave c(x, y) of the illumination light Q can be separated and obtained by extracting the data of such a specific region from the data of the light wave h (x, y).

(Light Wave Calculation Process S5)

Light waves h(x, y) and c(x, y) are obtained by propagating the light waves h(x, y) and c(x, y) at the above-mentioned $z=z_S$ to arbitrary reconstruction plane $z=z_P$ for image reconstruction. At the position of the reconstruction plane $z=z_P$, the phase component 4 of the light wave c(x, y) is obtained as $\xi=c/|c|$. The light wave h(x, y) can be made to propagate $z=z_S$ to $z=z_P$ using above-mentioned equation (11). In order to propagate the light wave c(x, y), a conversion function B(u, v) similar to G (u, v) in equation (10) is obtained by following equation (13) from the light wave c(x, y). Light waves h(x, y) and c(x, y) propagated to $z=z_P$ are in following equations (14) and (15), respectively. The phase component $\xi=c/|c|$ can be obtained using the light wave c(x, y) of following equation (14).

$$B(u,v)=\iint c(x,y)\exp[-i2\pi(ux+vy)]dxdy \quad (13)$$

$$h(x,y)=\iint G(u,v)\exp[i2\pi w(u,v)(z_P)]\exp[i2\pi(ux+vy)]dudv \quad (14)$$

$$c(x,y)=\iint B(u,v)\exp[i2\alpha w(u,v)(z_P-z_S)]\exp[i2\pi(ux+vy)]dudv \quad (15)$$

(Phase Adjustment Process S6)

This process is an important process for reconstructing a large numerical aperture image. The phase adjustment process (S6) is a process for removing the phase component of the light wave c(x, y) of the illumination light Q from the light wave h(x, y) of the mixed light (mixed light of the object light O and illumination light Q). The removal of the phase component is performed by obtaining the phase adjusted reconstruction light wave h/ξ, namely, h/(c/|c|) by dividing the light wave h(x, y) by the phase component ξ. The processing of each above-mentioned process (S2 to S6) is performed on the light of each of the incident directions $\theta^j$, j=1, . . . , N. This context is explicitly shown by describing the phase adjusted reconstruction light wave h/ξ as $h^j/\xi^j$, j=1, . . . , N.

(Light Wave Adding Up Process and Light Intensity Calculation Process S7)

In those processes, the synthetic light wave $H_P$ and the image $S_P$, which are the light waves on the reconstruction plane $z=z_P$, are generated by the following equations (16) and (17), respectively.

$$H_P(x, y, z_P) = \sum_{j=1}^{m} \frac{h^j}{c^j/|c^j|} \quad (16)$$

$$S_P(x, y, z_P) = |H_P(z, y, z_P)|^2 \quad (17)$$

The image $S_P$ can be seen as a distortion-less image by displaying the light intensity for every each pixel on an electronic display. The distortion-less image can be realized without using any imaging lens between the generating position of the object light O (mixed light T) and the photo-detector 4. By changing the value $z=z_P$ in equations (14) and (15), an image at that position can be reconstructed and displayed.

FIG. 10 and FIG. 11 show the enlargement of the numerical aperture in the above-mentioned image reconstruction method conceptually. Those figures are assumed to be the results of the image reconstruction by the transmission type equipment using the illumination lights Q1-Q4 of beam shapes with few spread shown as above-mentioned FIGS. 6A, 6B, and FIGS. 7A and 7B. The illumination lights Q are incident from the diagonal line directions (incident directions $\theta^j$, j=1-4) of the square photo-detector 4. Here, the numerical aperture of the photo-detector 4 is set as $NA_O$ and the numerical aperture of the illumination light Q being incident with slant is set as $NA_Q$, and $a=(NA_O)/\lambda$ and $b=(NA_O+NA_Q)/\lambda$ are defined using a wavelength $\lambda$. The area of ±a is a spatial frequency domain which is recordable with the photo-detector 4 in the frequency space uv.

Figure 10A:
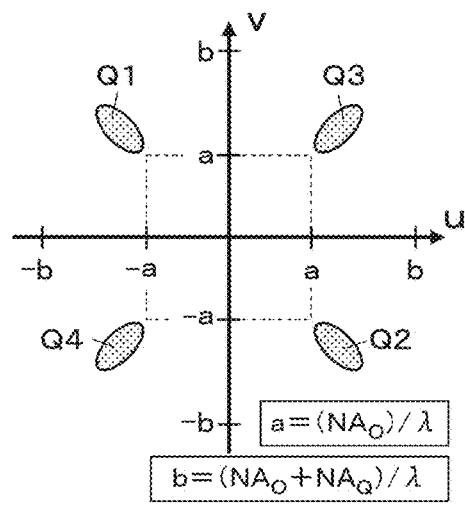
FIG. 10A is a figure showing a spatial frequency distribution of illumination lights from four directions.
Figure 10B:
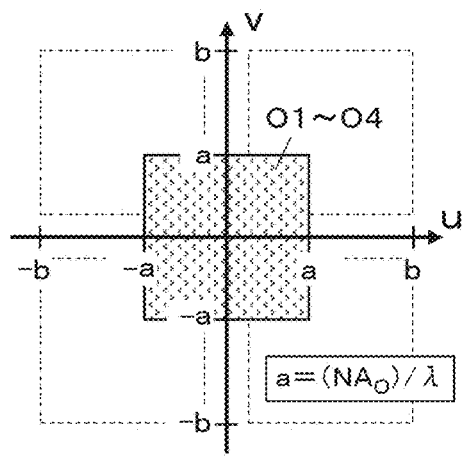
FIG. 10B is a figure showing a spatial frequency distribution of object lights acquired by the illumination lights.

FIGS. 10A and 10B show frequency distributions of the illumination lights Q1-Q4 and the object lights O1-O4 (those object lights generally contain the illumination lights and are mixed lights) before performing the above-mentioned phase adjustment process (S6). The illumination lights Q1-Q4 are recorded with the photo-detectors 41-44 at the periphery of the photo-detector 4, and appear in the exterior of the area ±a in FIG. 10A. Moreover, the object lights O1-O4 are recorded with the photo-detector 4 which is at the center of the arrangement of the photo-detectors 41-44, and appear in the area ±a in FIG. 10B before the phase adjustment. Such object lights O1-O4 are lights generated by the illumination lights Q1-Q4 being incident on the object with slant, and they are lights not obtained if the object is illuminated from the front. Such object lights O1-O4 are lights of modulated spatial frequency by the illumination lights Q1-Q4 being incident with slant.

Figure 11A:
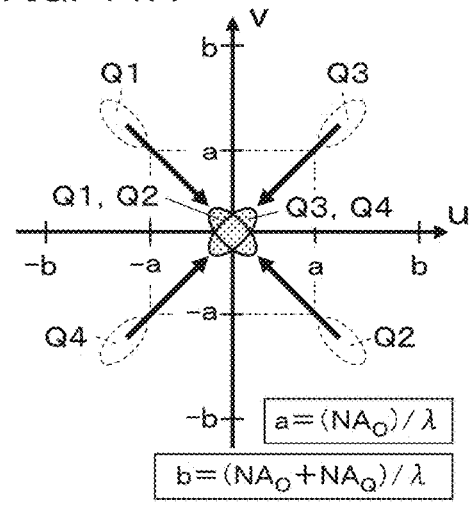
FIG. 11A is a figure showing a spatial frequency distribution after frequency modulation applied to the illumination light of FIG. 10A.
Figure 11B:
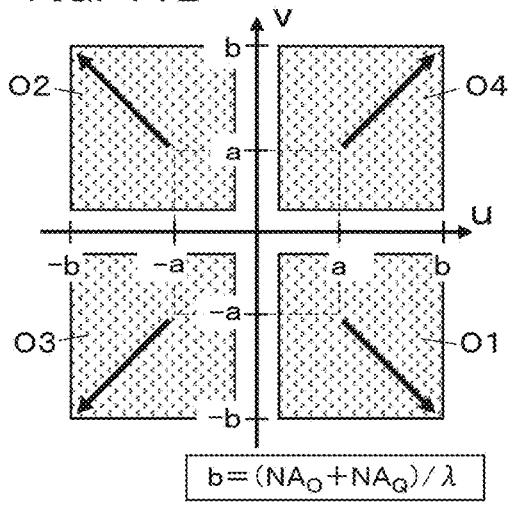
FIG. 11B is a figure showing a spatial frequency distribution after frequency modulation applied to the object light of FIG. 10B.

As shown in FIGS. 11A and 11B, after performing the phase adjustment process (S6), the spatial frequency of the image is shifted, namely demodulated, by the frequency modulation caused by the illumination lights being incident with slant.

As shown in FIG. 11A after the phase adjustment, the illumination lights Q1-Q4 being incident with slant move to the low frequency side at the center by performing the phase adjustment. Moreover, about the object lights O1-O4, as shown in FIG. 11B after the phase adjustment, the spatial frequency of the image is demodulated by the phase adjustment with h/ξ, and the spatial frequency of each object light O moves along the diagonal direction and to the high frequency side based on the phase of the illumination light $Q^j$ corresponding, respectively.

An image of high-resolution can be obtained because of the extension of the spatial frequency area of the image. When this is seen from a viewpoint of a numerical aperture, the numerical aperture of the object light is enlarged to $(NA_Q+NA_O)$ by the addition of the light waves $h^j/\xi^j$ after the phase adjustment. By the illumination lights from at least 2 directions, resolution can be improved partially. By using the illumination lights from the more directions, the spatial frequency space can be the more evenly covered by the data of the object lights, and the resolution for all directions in real space can be raised evenly. Moreover, by adding light waves $h^j/\xi^j$ multiple, the influence of a speckle can be reduced or sensitivity can be raised.

The addition of the above-mentioned light waves $h^j/\xi^j$ performed for each illumination light $Q^j$ which satisfy the condition that the wave number kz of each illumination light Q along the z axis direction becomes the same within predetermined tolerance level at the generating position of the object lights O to be observed. In order to make the wave number kz of each illumination light Q same, the azimuthal angle $\alpha^j$ may be arbitrary but the zenith angle $\beta^j$ should be made same in the incident direction $\theta^j=(\alpha^j, \beta^j)$ of each illumination light $Q^j$. According to such conditions, it is possible to eliminate the z dependence resulting from $kz(z=z_P)$ in the phase of the adding result, namely $\Sigma h^j/\xi^j$. The z dependence relates to the depth of focus. Therefore, based on a tolerance level of the depth of focus, the tolerance level of the fluctuation of the zenith angle β is set up. In addition, information on the object light generated in a space other than the reconstruction plane $z=z_P$ is also included in the object light wave $h^j$.

(Record and Reconstruction of a High-Resolution Image Using the Multi-Direction Incidence Illumination Light)

Here, the numerical aperture and resolution are explained. If an illumination light of a wavelength λ being incident from front, i.e., an illumination light of incidence angle $\theta_i=0$ is made incident on a diffraction pattern (it acts as a diffraction grating) of interval d, a relational expression d·sin $\theta_r=\lambda$ will be formed between the diffraction angle $\theta_r$, the wavelength λ, and the interval d. The spatial frequency u of the diffraction pattern is $u=1/d=\sin \theta_r/\lambda$. When a diffraction light is recorded with a square photo-detector of a numerical aperture $NA_O$, a recordable spatial frequency band of the diffraction pattern is expressed as $-(NA_O)/\lambda < u < (NA_O)/\lambda$. A theoretical resolution δ to this spatial frequency band is $\delta=\lambda/(2NA_O)$. Since the numerical aperture of the photo-detector is $NA_O<1$, the optical resolution limit is $\lambda/2$. This means the resolution limit when the propagating object light is recorded as a hologram of numerical aperture $NA_O$.

In the case of making the incidence angle $\theta_i$ of the illumination light be nonzero, the spatial frequency u of the diffraction pattern is $u=1/d=(\sin \theta_i+\sin \theta_r)/\lambda$ from a relational expression of d·sin $\theta_i$+d·sin $\theta_r=\lambda$. Therefore, when recording with the square photo-detector of numerical aperture $NA_O$, the recordable spatial frequency band of the diffraction pattern can be expressed as $(\sin \theta_i-NA_O)/\lambda < u < (\sin \theta_i+NA_O)/\lambda$. That is, a frequency shift occurs by an illumination light being incident with slant. If a numerical aperture of the illumination light Q is denoted by $NA_Q$ and an incident angle $\theta_i$ of the illumination light is changed in a range of $-NA_Q<\sin \theta_i<NA_Q$, the recordable spatial frequency zone of the diffraction pattern can be enlarged to a range of $(-NA_Q-NA_O)/\lambda < u < (NA_Q+NA_O)/\lambda$.

In the case of the illumination light of incident angle $\theta_i=0$, a wave with a spatial frequency u below $-(1/\lambda)$ and more than $(1/\lambda)$ becomes an evanescent wave which cannot propagate, however, in the case of the illumination light being incident with slant, it is changed into a wave possible to propagate. Although $(NA_Q+NA_O)$ in the above equation expresses a numerical aperture of the result enlarged by the direction change of the illuminating light direction and each numerical aperture $NA_Q$ and $NA_O$ is usually smaller than one, namely $NA_Q<1$ and $NA_O<1$, it is possible to enlarge the numerical aperture up to about a maximum of two if the object light is recorded by changing the direction of the illumination light at the most. Moreover, the greatest recordable spatial frequency band becomes $-2/\lambda < u < 2/\lambda$. The resolution limit determined from the width of this spatial frequency band becomes $\lambda/4$. This means that the resolution limit can be made high to about twice by recording the object light, changing the illumination direction.

The recorded object light O is a light produced by adding up each light generated at each point inside the object, and each phase of each of the lights becomes the same as the phase of the illumination light Q at the position where the light is generated. By using this fact, the phase adjusted reconstruction light wave h/(c/|c|) is derived by removing the phase component from the reconstructed light wave of the object light O for every incident direction. This phase adjustment operation standardizes mutually the phase of the object light O to each illumination light Q. By the phase adjustment operation using the division, the phase of the object light generated on the reconstruction plane is adjusted for each illumination light Q. Moreover, the object light receives a frequency modulation when it is generated by the illumination light being incident with slant, subsequently is recorded, and the recorded object light receives a frequency demodulation by the phase adjustment operation. A high frequency component arises by the frequency shift occurred with the demodulation.

Figure 12:
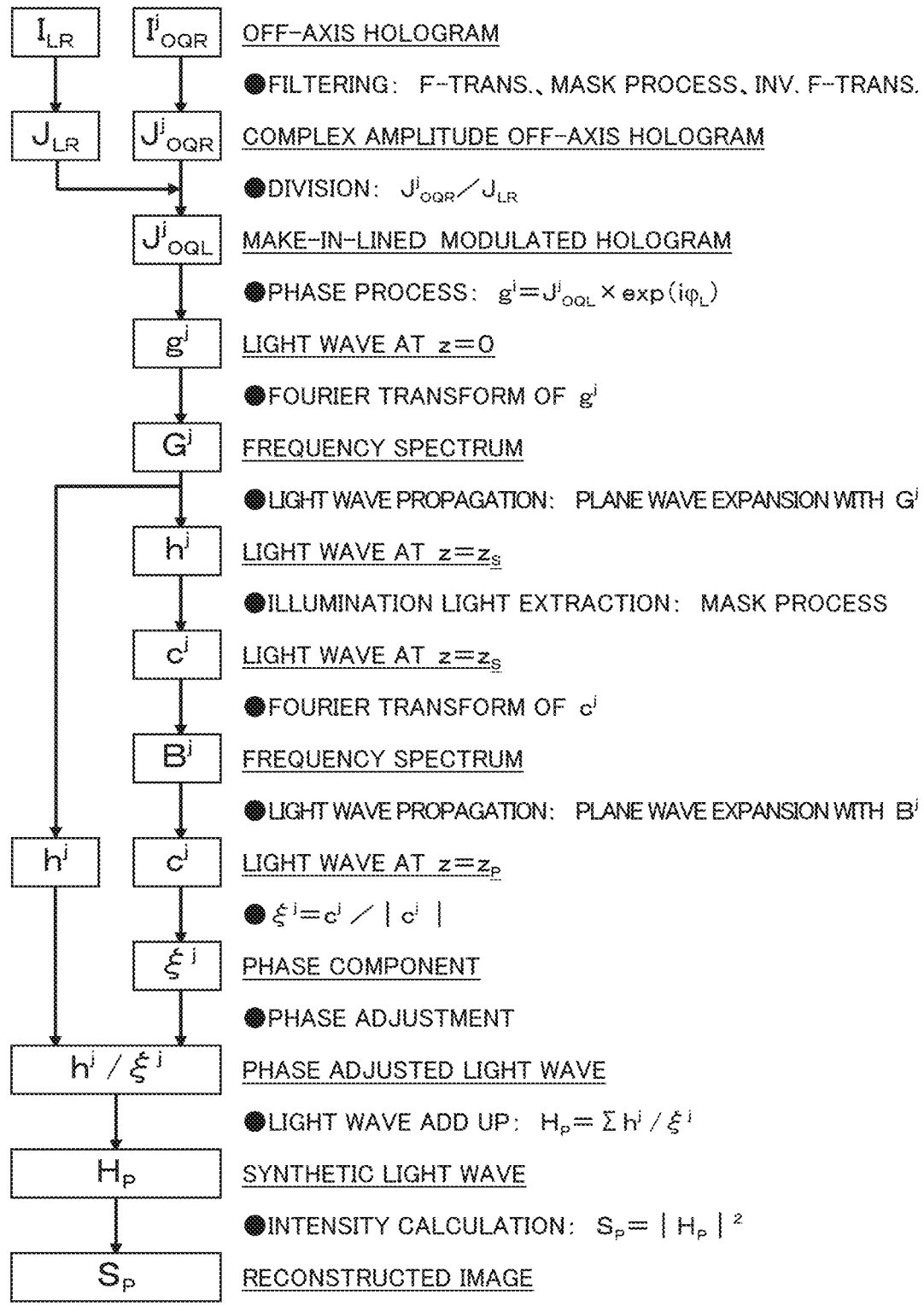
FIG. 12 is a block diagram showing a flow of processing the image reconstruction method.

Deriving a synthesized object light on a reconstruction plane by adding up the phase adjusted reconstruction light wave h/(c/|c|) for each illumination light Q, intensity of the object light generated around the reconstruction plane becomes strong by the addition after the phase adjustment because the phase of each light composing the object light coincides with the phase of the illumination light Q at the position the light is generated. Moreover, by adding up the phase adjusted reconstruction light wave h/(c/|c|) for each illumination light Q, the spatial frequency band of the synthesized object light becomes wide, and the resolution of the image reconstructed from the synthesized object light becomes high as a result. FIG. 12 summarizes the flow of processing of those image reconstruction methods.

According to the data processing method for a high-resolution hologram image of this embodiment, namely, the high-resolution hologram image reconstruction method, and the hologram data acquisition method for a high-resolution image, an image can be reconstructed in conditions of large numerical aperture made by adding the numerical aperture of illumination light to the numerical aperture of object light, because a plurality of object lights are recorded with spherical wave reference lights and multi-direction illumination lights and added up after being adjusted using the phase information on each illumination light. It is possible to exceed the resolution of the conventional optical microscope by the image reconstruction in large numerical aperture conditions. Moreover, theoretically, since object lights and illumination lights are recordable in a hologram with both a transmission type and a reflection type, any microscope of a transmission type and a reflection type can be realized.

The numerical aperture of an imaging lens is smaller than 1, and the resolution of the usual optical microscope cannot exceed half a wavelength of light. If the direction of illumination light is changed and object light is recorded, it is possible to record the diffraction light of a higher degree. Moreover, a resolution limit cannot be exceeded using a plurality of object lights recorded by a usual method. Those facts are known well. In this embodiment, an object light having an enlarged numerical aperture is synthesized, in order to achieve super-high-resolution exceeding a limit, with a method changing the direction of illumination light, recording the object lights in a plurality of holograms with the illumination lights correctly, using the object lights of the plurality of holograms, and using the phase information on the illumination light. In this embodiment, by recording object lights and illumination lights as holograms of a large numerical aperture using lens-less holography, separating the illumination lights from the holograms, and using a plurality of reconstructed illumination light waves and reconstructed object light waves, an object light having a numerical aperture exceeding 1 is computer-synthesized. By using the object light synthesized in this way, a high-resolution hologram image can be reconstructed.

(Recording at High Numerical Aperture Using a Plurality of Photo-Detectors)

Figure 13:
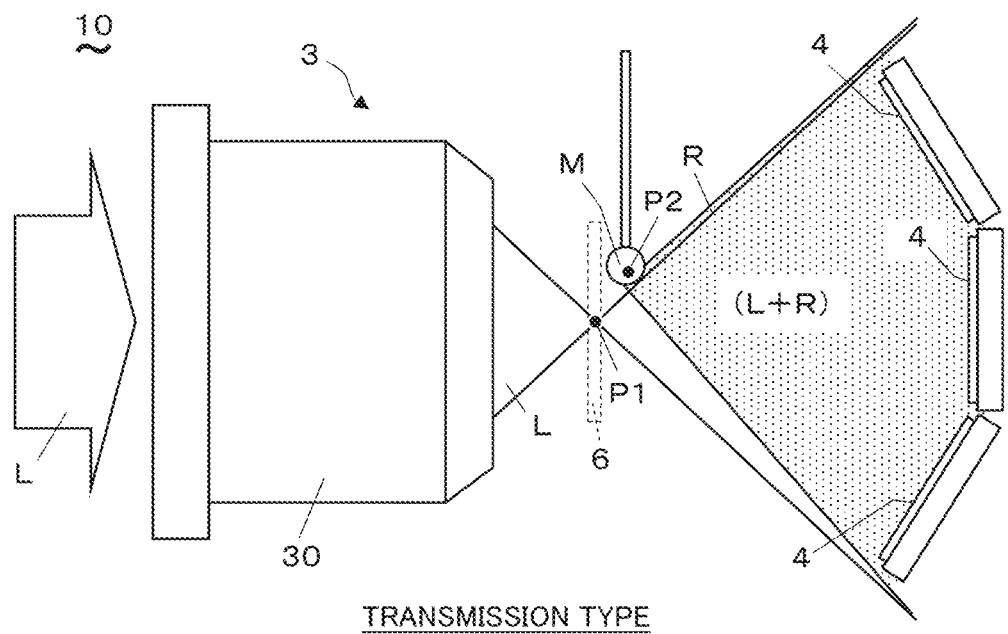
FIG. 13 is a side view of another example of a transmission type equipment acquiring data of an in-line spherical wave reference light used for the image reconstruction method.
Figure 14:
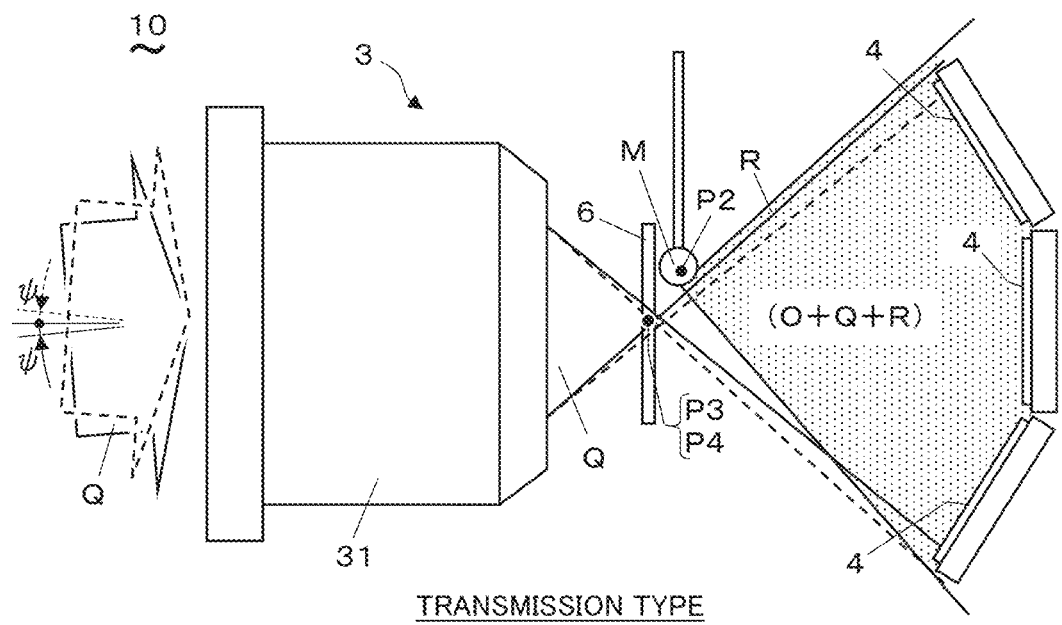
FIG. 14 is a side view of the equipment acquiring data of an object light used for the image reconstruction method.

FIG. 13 and FIG. 14 show an example of recording object lights using a plurality of photo-detectors 4. Since usual photo-detectors such as commercial CCDs are assumed to receive a light on a plane acceptance surface from the front through a lens, there is a problem that the sensitivity falls for the light being incident with slant to the acceptance surface. Then, the problem of sensitivity for the light being incident with slant is avoided by using a plurality of photo-detectors. By data processing including coordinate conversion etc., each recorded image with each photo-detector 4 can be reconstructed on an image reconstruction plane $z=z_P$ which is the acceptance surface of the front photo-detector 4, for example, and the images can be synthesized.

Figure 15:
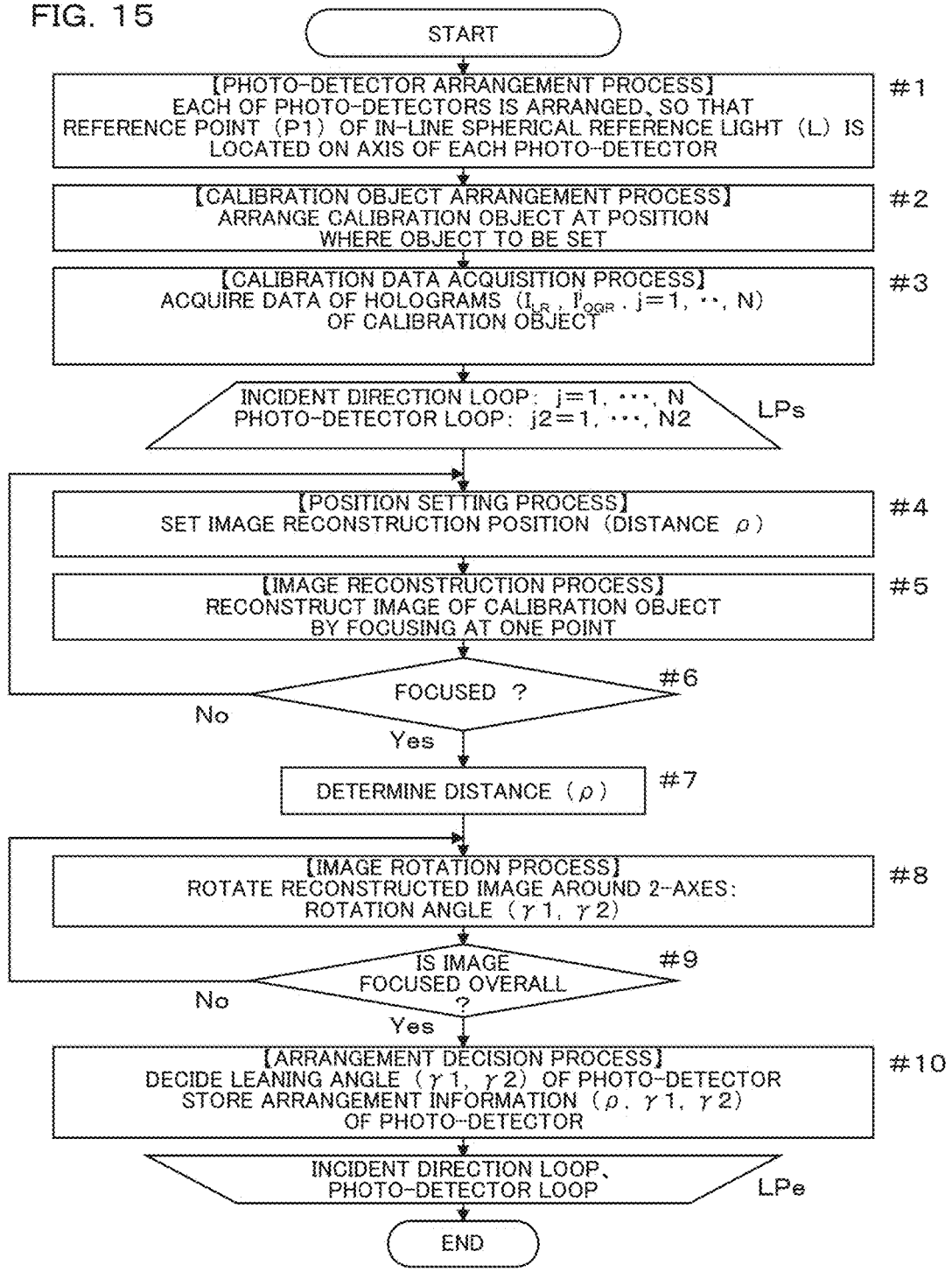
FIG. 15 is a flowchart of a calibration process of data between a plurality of photo-detectors in the image reconstruction method.

(Calibration method between a plurality of photo-detectors) FIG. 15 shows a calibration process between each data when the object light O and the illumination light Q are recorded using a plurality of photo-detectors as shown in above-mentioned FIG. 6, FIG. 7, FIG. 9, FIG. 13, and FIG. 14. In such a constitution for data acquisition equipment, each photo-detector is arranged so that the reference point (condensing point P1) of the in-line spherical wave reference light L may be located on the optic axis (center normal line of a photo-detector) of each photo-detector (#1). Next, an object for calibration having a pattern of which position-and-plane can be determined, for example, a glass, on the center of which surface minute points are arranged in a triangle, is arranged (#2). It is arranged in parallel with the acceptance surface of the central front photo-detector. Then, the data of holograms $I_{LR}$, $I^j_{OQR}$, j=1, ..., N is acquired with each photo-detector about the object for calibration like the data acquisition process (S0) in above-mentioned FIG. 1.

Then, in incident direction loop j=1, ..., N, and photo-detector loop j2=1, ..., N2 (processes #4-#10), the position of the photo-detector, i.e., the distance ρ from the reference point P1, and inclination angles γ1 and γ2 in the direction of 2-axes of the photo-detector are determined. In a processes (#4-#7), the distance ρ of the center of each photo-detector and the reference point P1 is determined. First, a temporary distance ρ is set (#4), and focusing is made on one of the point patterns on the object for calibration (#5, #6), and the distance ρ is determined (#7).

In a processes (#8, #9), a reconstructed image is rotated around the 2-axes of the photo-detector with rotation angles γ1 and γ2 using the point pattern of which distance ρ is determined as a fixed point, and angles where the whole image is in focus are determined as the inclination angles γ1 and γ2 of the photo-detector. The distance ρ and the angles γ1 and γ2 are recorded as photo-detector arrangement information (#10). The photo-detector arrangement information (ρ, γ1, γ2) is used as position adjustment information when the image data of each photo-detector are synthesized by piling up mutually within the same plane.

(High-Resolution-ization of Image)

Figure 16:
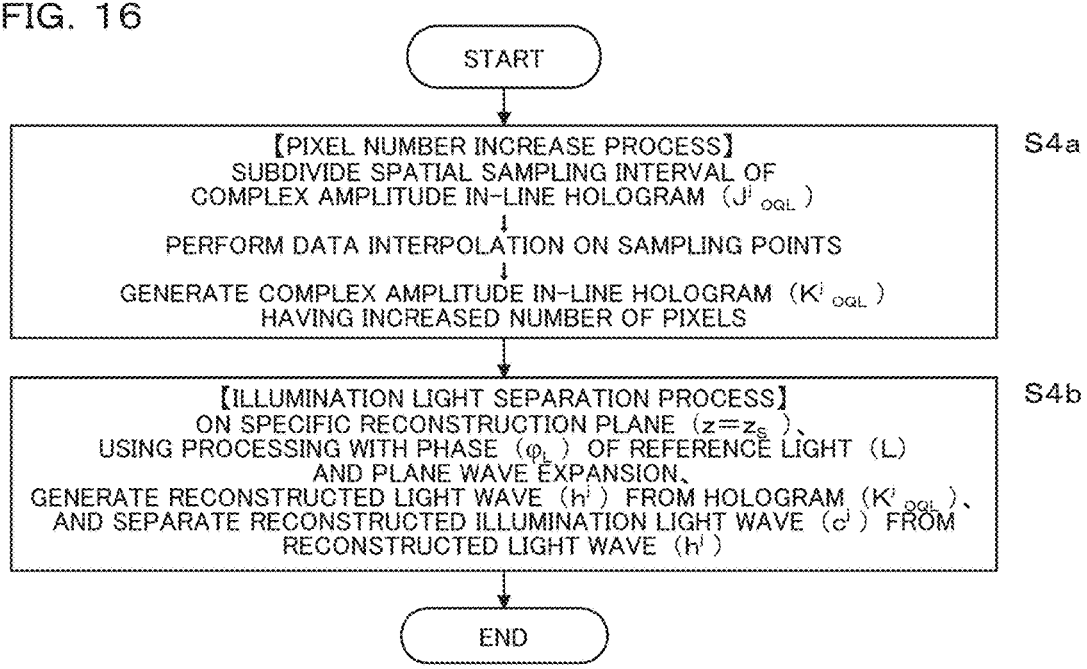
FIG. 16 is a flowchart of a resolution enhancement process in the image reconstruction method.
Figure 17A:
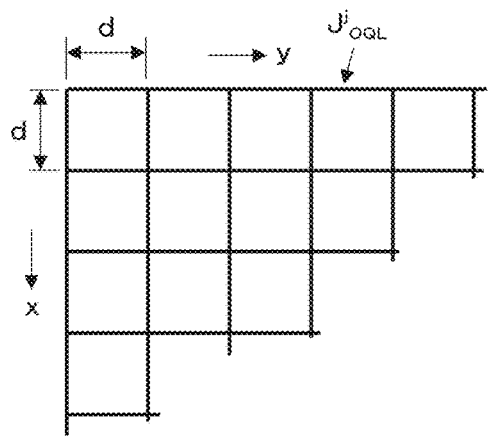
FIG. 17A is a partial view of a hologram.
Figure 17B:
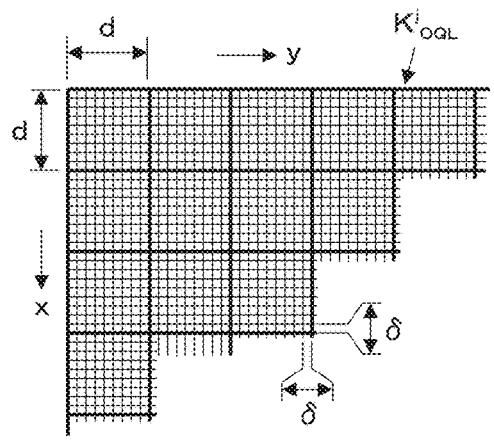
FIG. 17B is a partial view of a hologram showing a way to increase a spatial sampling interval.

FIG. 16, FIGS. 17A and 17B show high-resolution-ization of image, i.e., the improvement in the in-plane resolution of image. Magnification of image is made possible by the high-resolution-ization of the image. The high-resolution-ization is achieved by subdividing the sampling interval of the complex amplitude in-line holograms $J^j_{OQR}$, and increasing the number of samples substantially, as a result. The complex amplitude in-line holograms $J^j_{OQL}$ mentioned above are obtained using the spherical wave reference lights R and L and without using any imaging lens. Therefore, distortion is not generated, even if the image is magnified, which is reconstructed from the hologram made by subdividing the spatial sampling interval down to be small near the light wavelength. For that purpose, as shown in FIG. 16, the process of the high-resolution-ization comprises a pixel number increase process (S4a) for increasing the number of pixels substantially, and subsequent illumination light separation process (S4b). These processes are the improved version about resolution in the illumination light separation process (S4) shown in FIG. 1.

In the pixel number increase process (S4a), as shown in FIGS. 17A and 17B, the complex amplitude in-line holograms $J^j_{OQL}$ are assumed to have a spatial sampling interval d corresponding to the pixel pitch d of the photo-detector 4, and the spatial sampling interval d is subdivided into a spatial sampling interval δ. Then, data interpolation is performed to the new sampling points produced by the subdividing, and the number of pixels is increased substantially. As the data interpolation method, a data interpolation using the cubic equation or a data interpolation using a sinc function, commonly known in image processing, can be used. If the sinc interpolation is used for the data interpolation, numerical computation will take more time compared with the interpolation using the cubic equation, but a more proper result can be obtained. The complex amplitude in-line holograms $J^j_{OQL}$ (it is $J^j_{TL}$ by another notation), which have increased number of pixels as a result of the data interpolation, are defined here as complex amplitude in-line holograms $K^j_{OQL}$ (it is $K^j_{TL}$ by another notation). In addition, the pixel pitch d of the photo-detector 4 may differ mutually in the arranging direction (the xy direction) of the pixels, and also the spatial sampling interval δ may differ mutually in the arranging direction of the pixel.

In the illumination light separation process (S4b), using the hologram $K^j_{OQL}$ ($K^j_{TL}$) instead of the hologram $J^j_{OQL}$ ($J^j_{TL}$), the same processing as the illumination light separation process (S4) shown in FIG. 1 is performed, and the generation of the reconstructed light wave $h^j$ and the extraction and separation of the reconstructed light wave $c^j$ of illumination light are performed. An image reconstructed using those reconstructed light waves $h^j$ and $c^j$ is an image of improved resolution as much as d/δ times, and an image zoomed d/δ times can be obtained without distortion. The size (absolute size) of the image is measured using the pixel pitch d as a ruler.

(Improvement of Image Reconstruction Speed)

Figure 18:
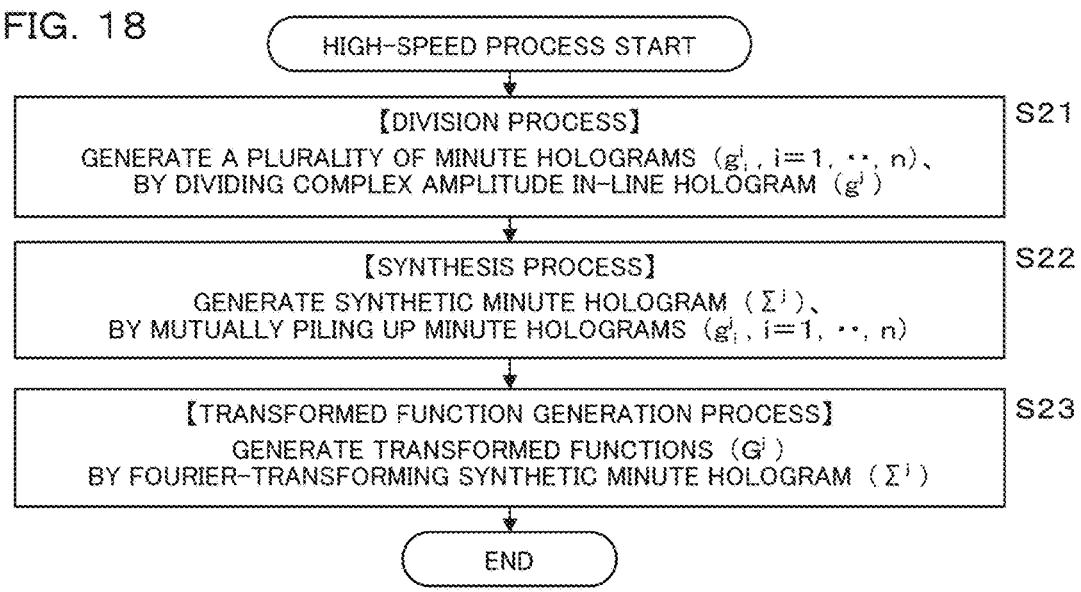
FIG. 18 is a flowchart of a high speed process in the image reconstruction method.

FIG. 18, FIGS. 19A and 19B, FIGS. 20A, 20B and 20C show high speed process which can reduce the calculation amount during image reconstruction. The high speed process is performed as shown in FIG. 18 by a division process (S21), a synthetic process (S22), and a transformed function generation process (S23). Those whole processes are an improved version of calculation speed for generation of the transformed function G(u, v) of above-mentioned equation (10). The improvement in the speed for this calculation speed is applicable to the generation of the transformed function B(u, v) from the reconstructed light wave c of above-mentioned equation (13) similarly. This improvement in the speed replies to a request resulting from the above-mentioned number increase of pixels. As mentioned above, high resolution reconstructed lights can be reconstructed from the complex amplitude in-line holograms $J^j_{OQL}$ (namely, $J^j_{TL}$), and therefore, the spatial sampling interval is narrowed to near the light wavelength to reconstruct high resolution images using the plane wave expansion. At this time, it is necessary to limit the number of sampling data within a feasible range where numerical computation is possible in appropriate calculation time using fast Fourier-transform (FFT), for example. On the contrary, if shortening of calculation time is possible, the number of sampling data can be increased and a distortion-less image of more high-resolution can be reconstructed.

This improvement in the speed is based on the principle that different data sets having different frequency bands each other, can be computed in a state they are added mutually according to the superposition of waves. Each information recorded in a different frequency band is retained without being lost even if they are piled up spatially. Using this fact, it is possible to generate a "minute hologram", which is wide band and compact, by dividing a wide band hologram and piling up them. Moreover, the complex amplitude in-line holograms $J^j_{OQL}$ ($J^j_{TL}$) and the light wave $g^j(x, y)$ as the complex amplitude in-line holograms hold the information for reconstructing an image in each of their divided domains. The light wave $g^j(x, y)$ is anew called a hologram $g^j(x, y)$ here.

Figure 19A:
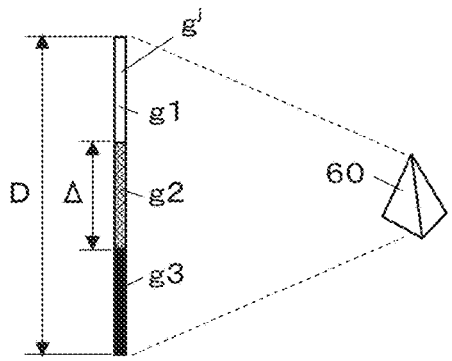
FIG. 19A is a conceptual diagram showing a single hologram for reconstruction and a reconstructed image.
Figure 19B:
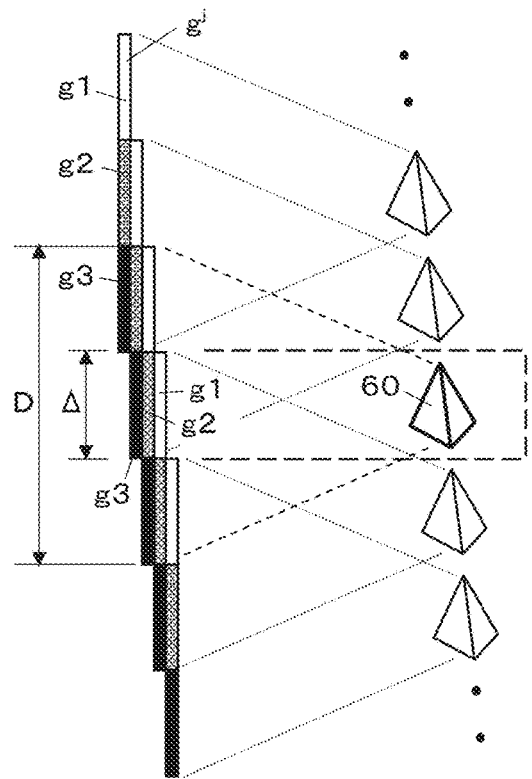
FIG. 19B is a conceptual diagram showing a plurality of images for reconstruction and a plurality of reconstructed images.

FIG. 19A shows a situation that the hologram $g^j(x, y)$ of width D is divided into minute holograms g1, g2, and g3 of width Δ. This hologram $g^j(x, y)$ can reconstruct a reconstructed image 60 by one hologram. Holograms made by piling up the holograms $g^j(x, y)$ one by one shifting each with width Δ, as shown in FIG. 19B, become a hologram with a period of width Δ, and can reconstruct many same reconstructed images 60 for every interval of width Δ. The number of calculation points is compressed into a number multiplied with the reciprocal of the number of piled-up minute holograms $g^j_i$. That is, the computation amount becomes 1/n when n holograms are piled up. The same is true for the illumination light complex amplitude in-line hologram $b^j(x, y)$.

Figure 20A:
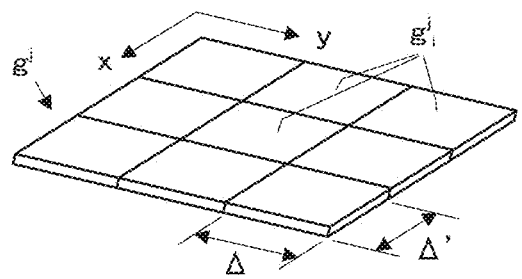
FIG. 20A is a conceptual diagram of a hologram.
Figure 20B:
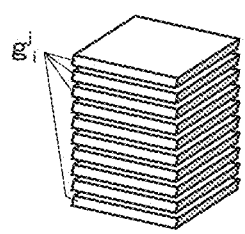
FIG. 20B is a conceptual diagram of dividing the hologram and piling up the divided.
Figure 20C:
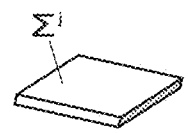
FIG. 20C is a conceptual diagram of a hologram formed by synthesizing the holograms of FIG. 20B.

Then, in the division process (S21), as shown in FIG. 20A, for example, the hologram $g^j(x, y)$ is divided into a plurality of minute holograms $g^j_i$ of width Δ and Δ', and as shown in FIGS. 20B and 20C, each minute hologram $g^j_i$ is piled up to generate a synthetic minute hologram $\Sigma^j$. If calculation, based on above-mentioned equations (10), (11), and (12), is performed to this synthetic minute hologram $\Sigma^j$, shortening of computation time can be achieved.

In the division process (S21), a plurality of minute holograms $g^j_i$, i=1, . . . , n are generated by dividing the hologram $g^j$. In the synthesis process (S22), the synthetic minute hologram $\Sigma^j$ is obtained by synthesizing the minute holograms $g^j_i$, i=1, . . . , n in piles mutually. In the transformed function generation process (S23), transformed functions $G^j(u, v)$ are obtained by Fourier-transforming the synthetic minute holograms $\Sigma^j$. Once the transformed functions $G^j(u, v)$ are obtained by Fourier-transforming, light waves $h^j(x, y, z_P)$ at arbitrary distance $z=z_P$ can be obtained using equations (1). Also for the light wave $c^j(x, y)$, similarly doing the dividing and obtaining synthetic minute holograms $\Pi^j$, the transformed functions $B^j(u, v)$ of above-mentioned equation (13) can be obtained by Fourier-transforming the synthetic minute holograms $\Pi^j$.

According to such image reconstruction method, a free focal image can be reconstructed easily and accurately at high speed by the numerical computation using FFT. The width Δ of the minute holograms $g^j_i$ can be set up according to the size of a reconstructed image regardless of the size (width D) or form of the complex amplitude in-line holograms $g^j(x, y)$. If the width Δ of division becomes smaller than the size of a reconstructed image, the reconstructed image will overlap with the adjacent image. Therefore, for example, if a photographic subject's size is 0.5 mm, width Δ will be made into a larger size than 0.5 mm.

(Ensuring the Dynamic Range of a Photo-Detector)

Figure 21:
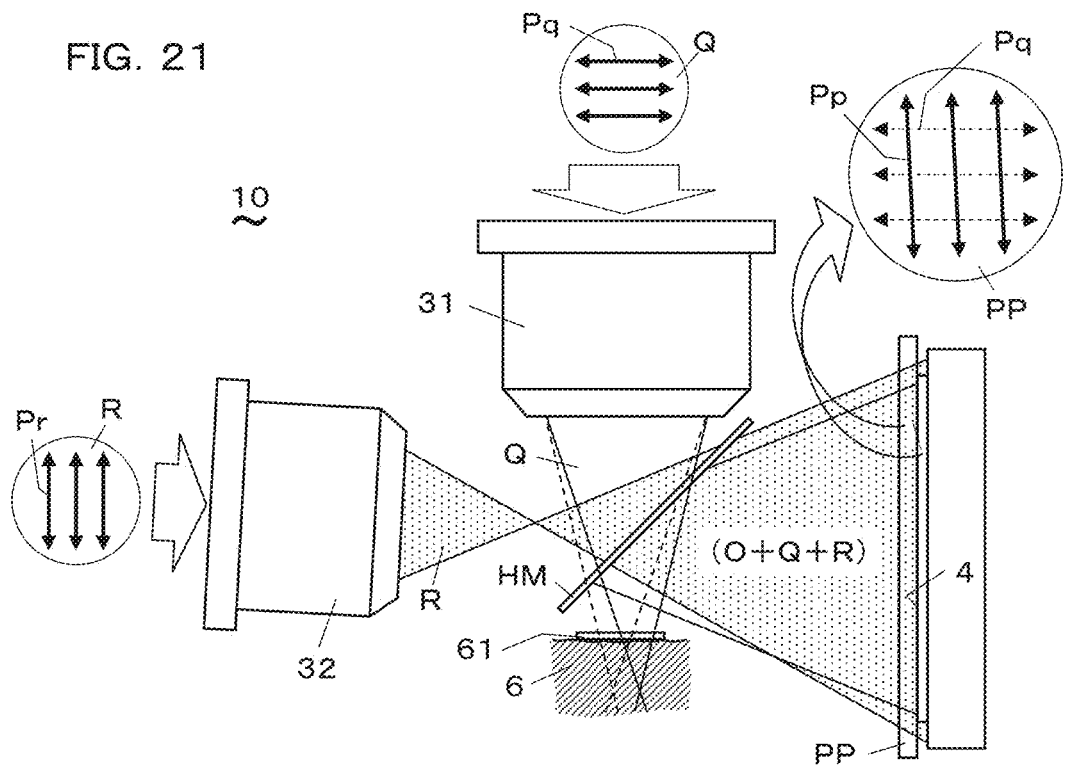
FIG. 21 is a side view showing another example of a reflection type equipment acquiring data of an object light O used for the image reconstruction method.

FIG. 21 shows that the light intensity of both the object light O and the illumination light Q, which will be accepted by the photo-detector 4, is adjusted using polarization of light when the hologram $I_{OQR}$ is recorded by the data acquisition method in reflection type. Since the object light O emitted from the object 6 generally has large directivity and is of low generating efficiency, the intensity of the object light O reaching the photo-detector 4 becomes small compared with the illumination light Q. In order to record such a weak object light O simultaneously with the illumination light Q, it is necessary to make the illumination light Q reaching the photo-detector 4 be attenuated sharply until its light intensity becomes the same amount as that of the object light O.

For that purpose, the illumination light Q is polarized in a direction Pq and the reference light R is polarized in a direction Pr, so that the illumination light Q and the reference light R which enter the photo-detector 4 are mutually in a perpendicularly intersecting polarization state. A polarizing plate PP is arranged ahead of the photo-detector 4. The recording of the common hologram $I_{OQR}$ is performed in a state that the reflected light of the illumination light Q is attenuated by making the object light O and the reflected light of the illumination light Q transmit the polarizing plate PP. Supposing that a light polarized in the direction Pp transmits the polarizing plate PP, it is possible to attenuate only the illumination light Q greatly without attenuating the reference light R by bringing the angle between the direction Pp and the direction Pq of polarization of the illumination light Q close to right-angled at the position where the polarizing plate PP is arranged. Moreover, since it is thought that the object light O will be in a random polarization state at the time of generation, it is thought that the object light O is not affected by the polarizing plate PP. Fundamentally, the intensity of the reference light R can be adjusted independently. Therefore, lights can be made incident on the photo-detector 4 in a state that the intensity of the illumination light Q is appropriately adjusted to the reference light R and the object light O. By the data acquisition method using such polarization and polarizing plate PP, clear holograms can be recorded, maintaining the light intensity of the object light O and ensuring the dynamic range of the photo-detector 4.

(Other Embodiment of the Hologram Image Reconstruction Method)

Figure 22:
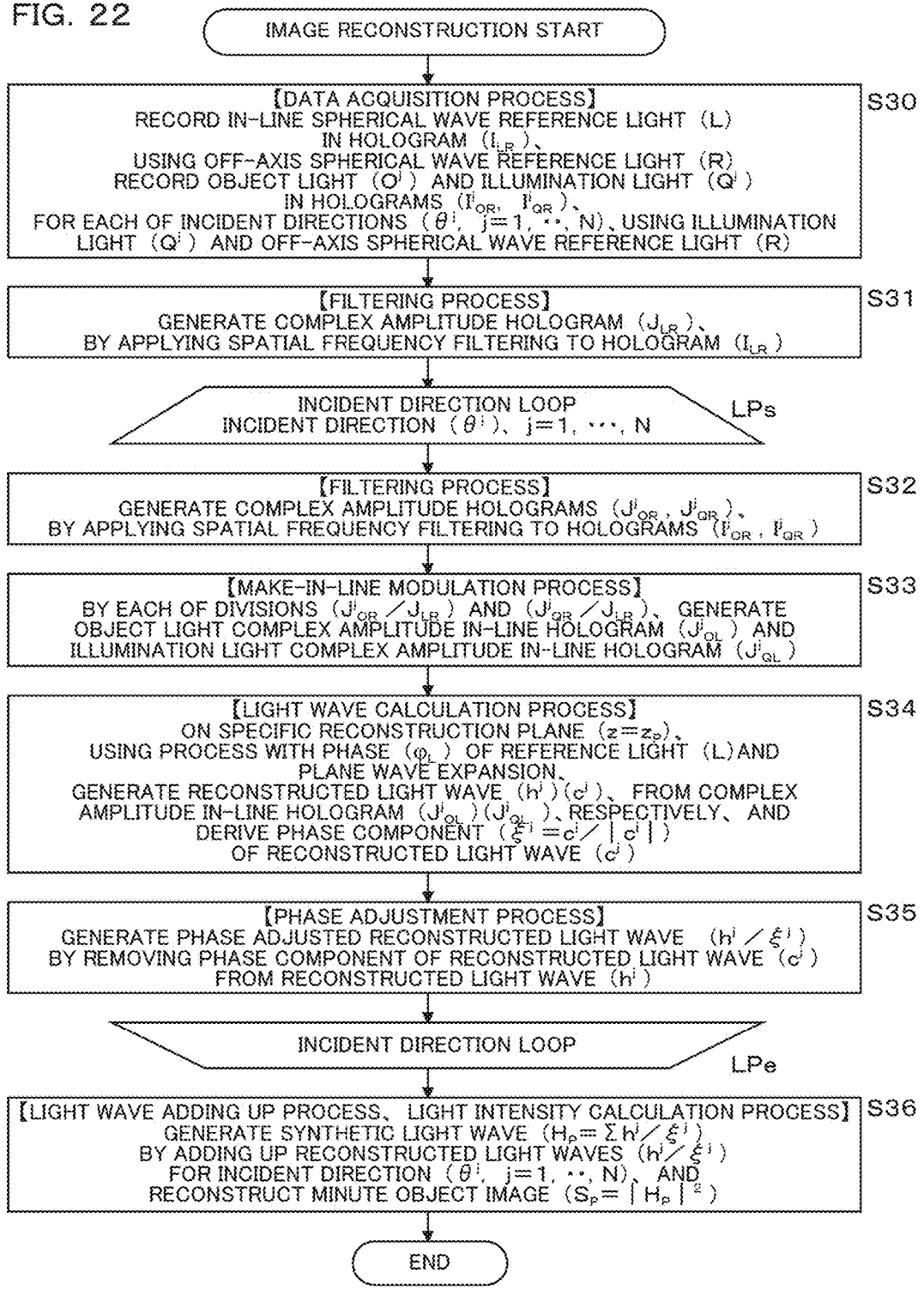
FIG. 22 is a flowchart showing a high-resolution hologram image reconstruction method according to another embodiment of the present invention.
Figure 23:
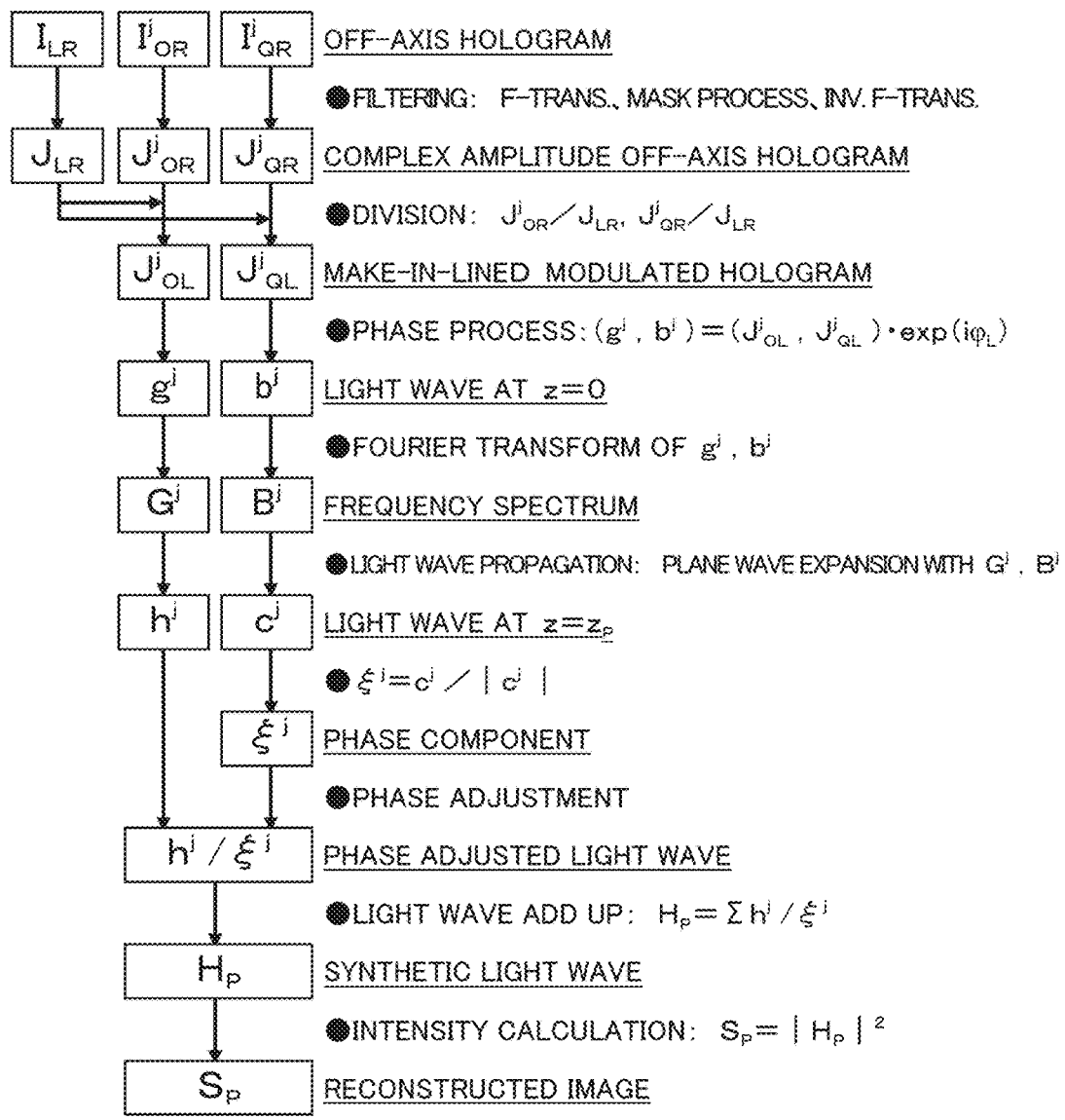
FIG. 23 is a block diagram showing a flow of processing the image reconstruction method.

FIG. 22 and FIG. 23 show another embodiment of the hologram image reconstruction method. This embodiment assumes the case that the data of hologram $I^j_{QR}$ of the illumination light $Q^j$ is acquired separately from the object light $O^j$ in a data acquisition process (S30). The data of the object light $O^j$ may be any of the hologram $I^j_{OR}$ which does not contain the illumination light $Q^j$ or the hologram $I^j_{OQR}$ which contains that. Here, it is explained with $I^j_{OR}$ as a representative. The hologram $I^j_R$ independent of the illumination light $Q^j$, separated from the object light $O^j$, is acquirable, for example, in the reflection type case by using the cover glass 61 or the light control mirror device based on the principle of photochromism set on the object 6. Because the hologram $I^j_{QR}$ of illumination light $Q^j$ alone can be obtained, the process, for extracting the information on the illumination light Q from the off-axis hologram $I^j_{OQR}$ by the illumination light partition process (S4) shown in above-mentioned FIG. 1, becomes unnecessary. In other words, what is necessary is just to process the illumination light separation process (S4) which extracts the information on the illumination light Q from the off-axis hologram $I^j_{OQR}$ when the data of hologram $I^j_{QR}$ of illumination light $Q^j$ is not obtained.

A filtering process (S31) is the same as the filtering process (S1) in FIG. 1. In a filtering process (S32), processing is performed about both holograms $I^j_{OR}$ and $I^j_{QR}$, and then complex amplitude off-axis holograms $J^j_{OR}$ and $J^j_{QR}$ are generated, respectively. In a make-in-line modulation process (S33), complex amplitude in-line holograms $J^j_{OL}$ and $J^j_{QL}$, which are the results of removing the reference light R component, are generated from the holograms $J^j_{OR}$ and $J^j_{QR}$, respectively.

In a light wave calculation process (S32 (sic)), on an arbitrary reconstruction plane $z=z_P$ for image reconstruction, generation of the reconstructed light waves $h^j$ and $c^j$ from the holograms $J^j_{OL}$ and $J^j_{QL}$, respectively, and also derivation of the phase component $\tilde{\xi}^j = c^j/|c^j|$ are performed without passing through the illumination light separation process. A phase adjustment process (S35), and a light wave adding up process and a light intensity calculation process (S36) are the same as the phase adjustment process (S6), and the light wave adding up process and the light intensity calculation process (S7) of FIG. 1. FIG. 23 summarizes the flow of those processes of image reconstruction method. About the reconstructed light wave $c^j$ of the illumination light $Q^j$, generation of the reconstructed light wave $b^j$ and generation of the transformed function $B^j$ from the hologram $J^j_{QL}$ at $z=0$ are performed like g and G of above equations (9) and (10). Then, finally, the reconstructed light wave $c^j$ is generated on the reconstruction plane $z=z_P$ for image reconstruction.

(Holographic Microscope)

Figure 24:
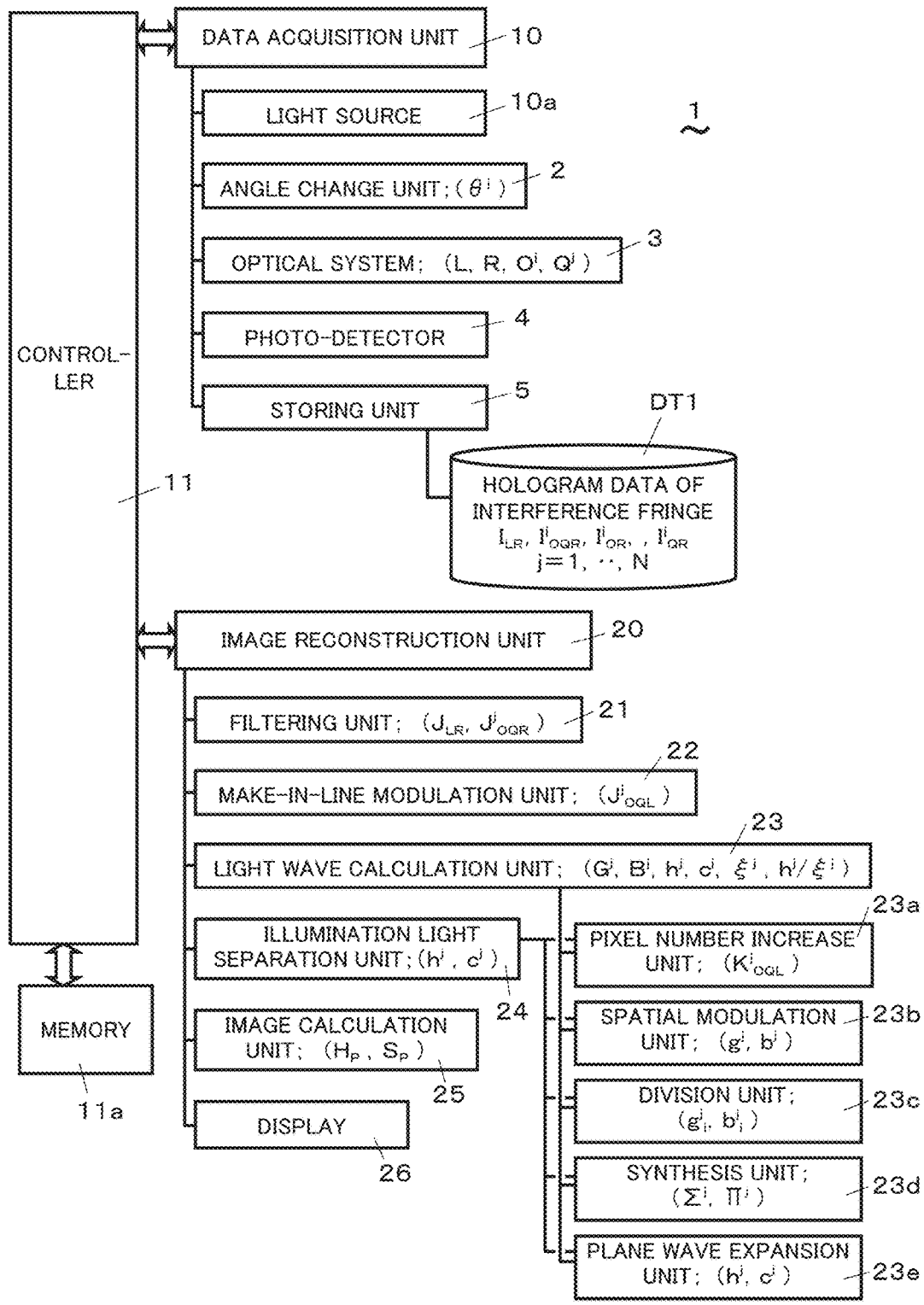
FIG. 24 is a block diagram showing a holographic microscope according to an embodiment of the present invention.

FIG. 24 shows the holographic microscope (henceforth the microscope 1) according to an embodiment of the present invention. The microscope 1 is equipped with a data acquisition unit 10 which acquires holograms of the minute object 6 using illumination light Q of which incident direction is changed, and an image reconstruction unit 20 which reconstructs images from the holograms acquired by the data acquisition unit 10. The microscope 1 is further equipped with a control unit 11 which controls the data acquisition unit 10 and the image reconstruction unit 20, and a memory 11a which memorizes programs for calculation such as FFT and data for control, etc. The data acquisition unit 10 is equipped with a light source 10a, an angle change unit 2, an optical system 3, a photo-detector 4, and a storing unit 5. The light source 10a is a laser which emits a coherent light. The angle change unit 2 is used in combination with the optical system 3, and changes incident directions $\theta^j$, j=1, ..., N of the illumination light Q on the object by simultaneous or arbitrary methods one by one.

The optical system 3 is combined with the angle change unit 2, and constitutes illumination lights $Q^j$, j=1, ..., N, an off-axis spherical wave reference light R, and an in-line spherical wave reference light L from the light emitted by the light source 10a, and propagates those lights and an object light O which is emitted from the minute object 6 illuminated with the illumination light Q. The photo-detector 4 is used by one alone or a plurality of them, and each of them changes light intensity into electric signal, and outputs the signal to the storing unit 5. The storing unit 5 stores the interference-fringes $I_{OQR}$ between the off-axis spherical wave reference light R and the mixed light T of the object light O and the illumination light Q, the interference-fringes $I_{LR}$ between the off-axis spherical wave reference light R and the in-line spherical wave reference light L, etc., as the holograms $I^j_{OQR}$, $I^j_{LR}$ (sic), j=1, ..., N using the photo-detector(s) 4 for each illumination light of incident directions $\theta^j$, j=1, ... N emitted by the light source 10a. The data of holograms are saved in the memory 11a and database DT1. Other holograms $I^j_{OR}$, $I^j_{OQR}$, and hologram data used for calibrating the arrangement of the plurality of photo-detectors, etc. are acquired and stored similarly.

The image reconstruction unit 20 is equipped with a filtering unit 21, a make-in-line modulation unit 22, a light wave calculation unit 23, an illumination light separation unit 24, an image calculation unit 25, and a display unit 26. The filtering unit 21 generates the complex amplitude off-axis hologram $J^j_{OQR}$ in which the object light $O^j$ and the illumination light $Q^j$ are recorded and the complex amplitude off-axis hologram $J^j_{LR}$ (sic) in which the off-axis spherical wave reference light R is recorded, etc. applying spatial frequency filtering to the holograms $I^j_{OQR}$, $I^j_{LR}$ (sic), etc. stored by the storing unit 5.

The make-in-line modulation unit 22 generates the complex amplitude off-axis holograms $J^j_{OQR}$, etc., which are the results of removing the reference light R component, by dividing the data of each complex amplitude off-axis hologram $J^j_{OQR}$ which were generated by the filtering unit 21 with the data of each complex amplitude off-axis hologram $J^j_{LR}$ (sic) generated by the filtering unit 21, respectively.

The light wave calculation unit 23 and the illumination light separation unit 24 do the calculation of the light wave reconstruction and propagation and processing of the phase adjustment using the phase of the illumination light, and moreover, the illumination light separation unit 24 does the separation of the light wave c of the illumination light from the mixed light T of the object light O and the illumination light Q. That is, the light wave calculation unit 23 processes the light wave calculation process (S5) shown in FIG. 1 and the light wave calculation process (S34) shown in FIG. 22, and the illumination light separation unit 24 processes the illumination light separation process (S4) shown in FIG. 1.

The light wave calculation unit 23 and the illumination light separation unit 24 are equipped with a pixel number increase unit 23a, a spatial modulation unit 23b, a division unit 23c, and a synthesis unit 23d in order to perform those processes in high speed and high-resolution, and equipped with a plane wave expansion unit 23e in order to generate light waves in an arbitrary position. The pixel number increase unit 23a subdivides the spatial sampling intervals of the complex amplitude in-line hologram $J^j_{OQL}$, etc., performs data interpolation to the new sampling points generated by the subdivision, and increases the number of pixels substantially. The spatial modulation unit 23b generates the holograms $g^j$, which express the object lights, from the complex amplitude in-line holograms $K^j_{OQL}$ of which number of pixels is increased by the pixel number increase unit 23a. The division unit 23c divides the holograms $g^j$ into minute plurality of holograms $g^j_i$, i=1, ..., n. The synthesis unit 23d piles up mutually each minute holograms $g^j_i$ obtained by the division unit 23c, and generates the synthetic minute hologram $\Sigma^j$. Those processes are the processing of the high-resolution-ization of image shown in FIG. 16, and the improvement of image reconstruction speed shown in FIG. 18.

The plane wave expansion unit 23e, for example, Fourier-transforms the holograms $g^j$ reconstructed by the spatial modulation unit 23b and obtains the results as the transformed functions $G^j$, and generates the reconstructed light waves $h^j$ using the spatial frequencies (u, v, w), which satisfies the dispersion relation of a plane wave, and the transformed functions $G^j$. Moreover, the plane wave expansion unit 23e obtains the transformed functions $G^j$ by Fourier-transforming the synthetic minute hologram $\Sigma^j$ generated by the synthesis unit 23d, and using that, generates the reconstructed light wave h like the above. The plane wave expansion unit 23e performs processing for the illumination lights, similarly.

The image calculation unit 25 performs processes of the light wave adding up and the light intensity calculation process (S7) shown in FIG. 1, and obtains the synthetic light wave $H_P$ and the image $S_P$. The display unit 26 is a FPD such as a liquid crystal display, and displays an image etc. Each part of the image reconstruction unit 20, except for the display unit 26, is constituted using software containing programs and their subroutine group working on a computer.

Practical Example

FIG. 25 to FIG. 30 show the practical example of principle demonstration experiment. In this practical example, images of USAF test target were reconstructed using the holographic microscope equipped with the transmission type data acquisition equipment using the condenser 31 for the illumination light shown in above-mentioned FIG. 2 and FIG. 3. A semiconductor excitation solid-state laser (wavelength of 532 nm, outputs of 50 mW) was used for acquiring each hologram as the light source of coherent light, and camera link CCD cameras was used for recording the holograms as the photo-detectors. A reference light R of large numerical aperture was made by making the laser light reflect with a ball of gold (a minute ball M) about 100 μm in diameter, and the interference-fringes $I_{LR}$ made by the reference light R and a spherical wave reference light L. Moreover, by illuminating a USAF target with the illumination light Q which is condensed with a lens of NA=0.28, and changing the illumination angle (the incident direction on the target) in the four directions, and four holograms of interference-fringes $I_{OQR}$ made by an object light O and the reference light R were acquired.

Figure 25A:
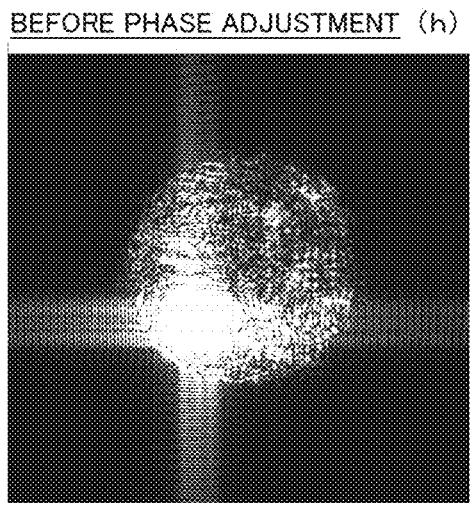
FIG. 25A is a figure of a spatial frequency distribution of reconstructed light waves of object lights and illumination lights in a hologram of a USAF test target acquired with illumination lights of leaned incident directions using the microscope.
Figure 25B:
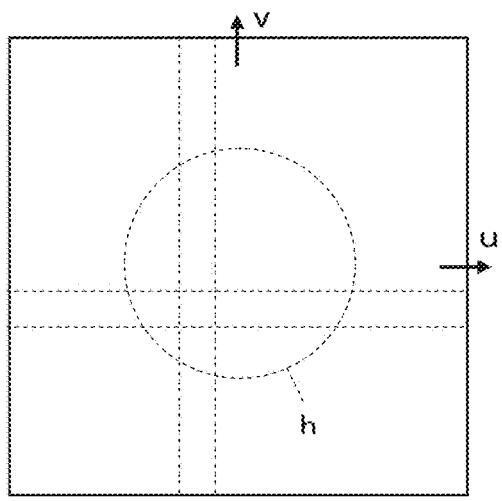
FIG. 25B is an explanatory diagram for FIG. 25A.
Figure 26A:
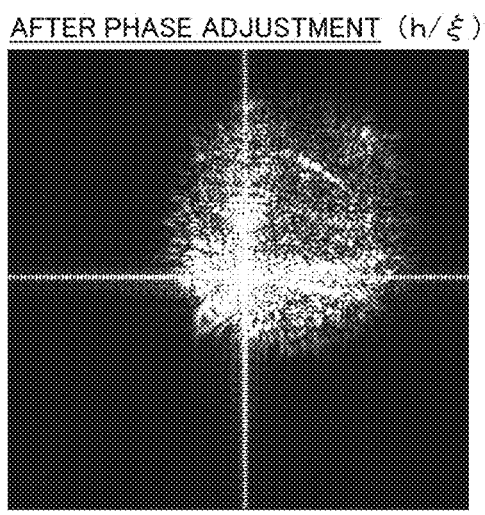
FIG. 26A is a figure of a spatial frequency distribution of reconstructed light waves, after frequency modulation, of the object lights and illumination lights shown in FIG. 25A.
Figure 26B:
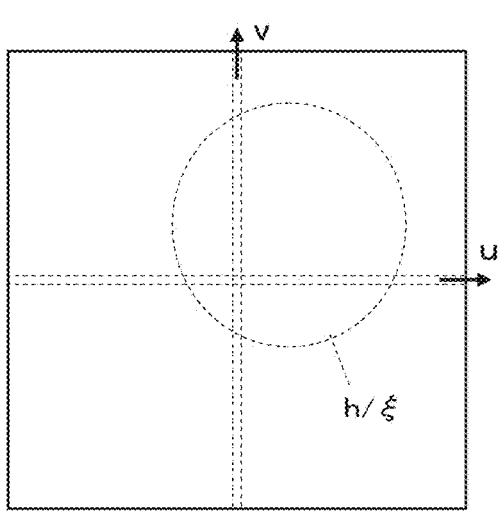
FIG. 26B is an explanatory diagram for FIG. 26A.
Figure 27:
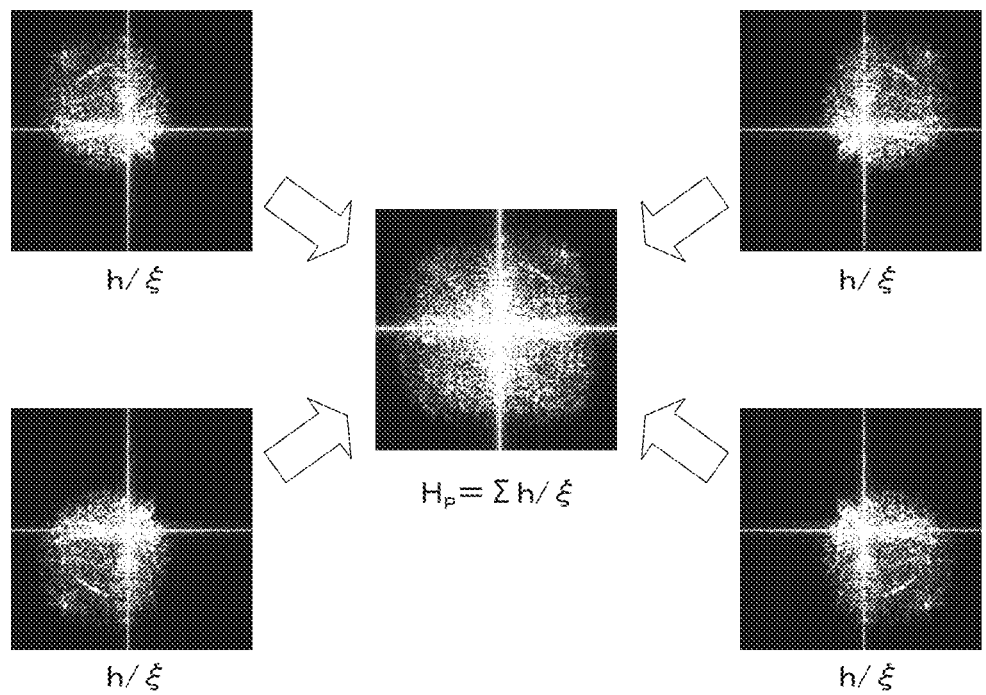
FIG. 27 is a conceptual diagram of a hologram showing how to add up four reconstructed light waves obtained by performing frequency modulation like the case of FIG. 26A after acquiring holograms with illumination lights from four directions.
Figure 28:
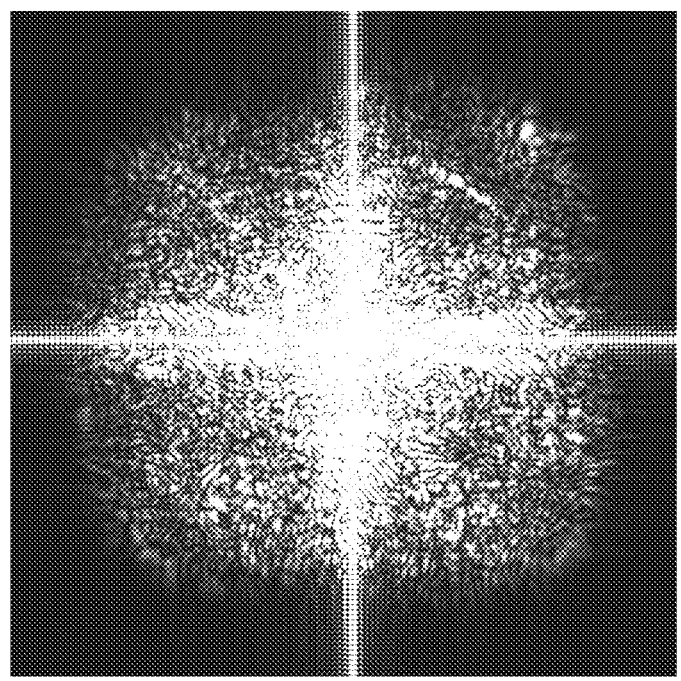
FIG. 28 is a figure of a spatial frequency distribution of the reconstructed light waves synthesized by the process of FIG. 27.

FIGS. 25A and 25B show a spatial frequency distribution of the reconstructed light wave of the object light and the illumination light in one of the holograms of the USAF test target acquired with illumination light leaned to one direction. These figures correspond to the object light reconstructed light wave h containing the illumination light Q and the object light O. FIGS. 26A and 26B show a spatial frequency distribution of an object light reconstructed light wave h/ξ after phase adjustment (frequency modulation) using the phase 4 of the illumination light reconstructed light wave c generated by separating the illumination light Q from the above-mentioned reconstructed light wave h. The spatial frequency distribution has shifted by the phase adjustment. FIG. 27 shows conceptually, how the four holograms (reconstructed light waves) were added up, where the holograms were acquired, like the light wave of FIG. 26A, using illumination lights of incident directions of four directions, respectively, and the phase adjustment was done to them. FIG. 28 shows the spatial frequency distribution of the reconstruction light wave synthesized by this processing.

Figure 29:
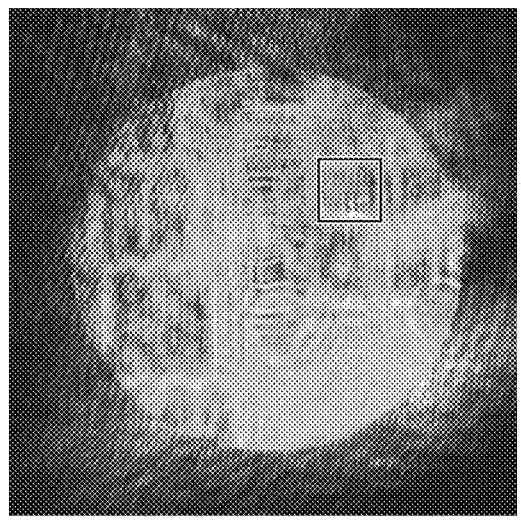
FIG. 29 is an image of one of a plurality of holograms of the USAF test target obtained by changing the incident direction of an illumination light using the microscope.
Figure 30A:
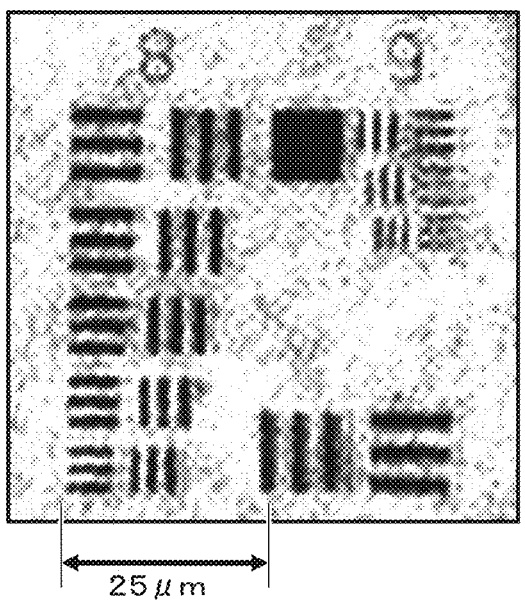
FIG. 30A is a figure showing a reconstructed image of the USAF test target reconstructed using the plurality of holograms of different incident directions.
Figure 30B:
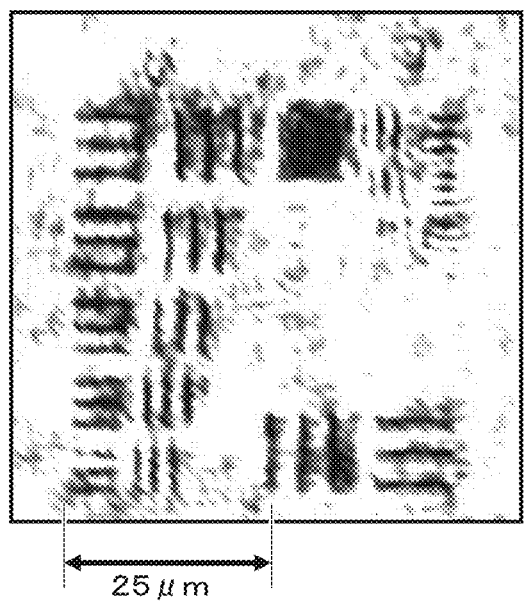
FIG. 30B is a figure showing a reconstructed image of the USAF test target reconstructed using one of the holograms.

FIG. 29 shows an image reconstructed from one of the four holograms with different incident directions of the illumination light to the USAF test target. FIG. 30A shows a practical example, and shows, with respect to the portion shown by a square in the picture of FIG. 29, a reconstructed image, i.e., a reconstructed image derived from the synthetic light wave $H_P$, of the USAF test target reconstructed using four holograms each of which has the different incident angle, mutually. FIG. 30B shows, as an example of reference, a reconstructed image of the USAF test target reconstructed using one of the holograms.

In the image of FIG. 30A, distortions have arisen, resulting from the light intensity distribution of the reference light R affected by unevenness of the ball surface of gold (minute ball M). Although the information on the reference light R should be essentially eliminated in the process of image reconstruction, if position change etc. of the minute ball M for generating the reference light R arises during the recording of the interference fringes $I_{LR}$ and the recording of the interference fringes $I_{OQR}$, the information on the reference light R will remain as a noise. Using FIG. 30A, deterioration of the image quality by such a noise can be checked. These noises can be reduced by securing the holding conditions of the ball of gold more stably and using smoother ball of gold. Moreover, in this practical example, the reconstructed light wave c of the illumination light Q was separated from the object light O using the fact that the illumination light Q transmitting through the USAF test target as a photographic subject condenses at one point, and lights scattered with by photographic subject distribute widely around the condensing point.

By the reconstructed image of FIG. 30A, the minimum portion of a line interval of 0.78 μm can be recognized. The high-resolution-ization using the synthesis of the object lights in this practical example can be verified by comparing with the resolution 0.95 m which is derived from NA=0.28 of one hologram. Moreover, in the practical example, image quality is greatly improved as compared with the reconstructed image shown in FIG. 30B.

In addition, various modification is possible for the present invention, without being restricted to the above-mentioned constitution. For example, a constitution can be made by composing each constitution of the embodiment mentioned above.

INDUSTRIAL APPLICABILITY

The holographic microscope and the data processing method (the hologram data acquisition method for a high-resolution image and the high-resolution hologram image reconstruction method) based on the off-axis holography using the multi-direction illumination lights according to the present invention have many advantages that high-speed recording of distortion-less object light waves without using any imaging lens, recording of transmitting object lights or reflecting object lights with a numerical aperture exceeding 1, reconstruction of a distortion-less free-focal image of super high solution using strict solutions, high-speed image reconstruction using FFT, and quantitative analysis of the optically transmitting object using phase distribution of wave, etc. Therefore, the present invention is applicable to the wide range use taking those advantages in the field of cell differentiation and organization formation, the field of regenerative medicine, the field of biotechnology, the field of medical diagnosis, and the field of precision optical measurement, etc. As the novelty and predominance of the present invention to the conventional technology, the followings are mentioned: (1) to enable a deep super-high-resolution three-dimensional measurement of the living tissue or living cells in culture; (2) to enable a super-high-resolution measurement of the living body tissue by low energy irradiation; (3) to enable a super-high-resolution measurement of transparent biological tissue using the optical phase distribution; and (4) to enable a super-high-resolution three-dimensional optical measurement using reflected object lights. The present invention can synthesize a hologram of large numerical aperture greater than 1 in the air using a plurality of holograms of large numerical aperture, and enables reconstruction of a three-dimensional image exceeding the resolution limit of the usual optical microscope. Thereby, a super-high-resolution three-dimensional biological microscope can be realized, and three-dimensional observation of submicroscopic photographic subjects, such as a mitochondria and bacteria is attained.

This application is based on the Japan patent application 2013-223761, and the contents should unite to the present application invention as a result by referring to the specification and drawing of the above-mentioned patent application.

EXPLANATION OF LETTERS OR NUMERALS

1 Holographic microscope
10 Data acquisition equipment, data acquisition unit
10a Light source
2 Angle change unit
20 Image reconstruction unit
22 Make-in-line modulation unit
23 Light wave calculation unit
24 Illumination light separation unit
23a Pixel number increase unit
3 Optical system
4, 41-44 Photo-detector
5 Storing unit
6 Object
$H_P$ Synthetic light wave
$I_{LR}$ Reference light off-axis hologram
$I_{QR}$ Illumination light off-axis hologram
$I_{OR}$ Object light off-axis hologram
$I_{OQR}$ Object light illumination light off-axis hologram
$J_{LR}$ Reference light complex amplitude off-axis hologram
$J_{OR}$ Object light complex amplitude off-axis hologram
$J_{QR}$ Illumination light complex amplitude off-axis hologram
$J_{OQR}$ Object light illumination light complex amplitude off-axis hologram
$J_{OL}$ Object light complex amplitude in-line hologram
$J_{QL}$ Illumination light complex amplitude in-line hologram
$J_{OQL}$ Object light illumination light complex amplitude in-line hologram
L In-line spherical wave reference light
M Minute ball (minute surface of a sphere)
O, $O^j$, O1-O4 Object light
Q, $Q^j$, Q1-Q4 Illumination light
R Off-axis spherical wave reference light
$S_P$ Reconstructed image (light intensity)
$c^j$ Reconstructed light wave of illumination light (illumination light reconstructed light wave)
$g^j$ Light wave, hologram
$h^j$ Reconstructed light wave of object light (object light reconstructed light wave)
j Integer variable which identifies incident direction
$z_P$, $z_S$ Reconstruction plane
$\xi^j$ Phase component contained in the reconstructed light wave c of illumination light Q
$\varphi^j_L$ Phase of in-line spherical wave reference light

The invention claimed is:

1. A holographic microscope, comprising:
a data acquisition unit which acquires a hologram of an object, and
an image reconstruction unit which reconstructs an image of the object from the hologram acquired by the data acquisition unit, wherein
the data acquisition unit comprises:
an optical system which generates an in-line spherical wave reference light (L), an illumination light (Q), and an off-axis spherical wave reference light (R) with a coherent light emitted by a light source, and transmits the generated lights and an object light (O) emitted from the object illuminated with the illumination light (Q);
an angle change unit which changes an incident direction of the illumination light (Q) on the object;
a photo-detector which changes a light intensity into an electric signal and outputs it; and
a storing unit which stores a reference light off-axis hologram ($I_{LR}$) of interference fringes between the in-line spherical wave reference light (L) and the off-axis spherical wave reference light (R), object light off-axis holograms ($I^j_{OR}$, j=1, ..., N) of interference fringes between the off-axis spherical wave reference light (R) and object lights ($O^j$, j=1, ..., N) emitted from the object illuminated with the illumination lights ($Q^j$, j=1, ..., N) having different incident directions ($\theta^j$, j=1, ..., N) generated from the coherent light by using the optical system and the angle change unit, and illumination light off-axis holograms ($I^j_{QR}$, j=1, ..., N) of interference fringes between the illumination lights ($Q^j$, j=1, ..., N) and the off-axis spherical wave reference light (R), in a memory by using the photo-detector, and
the image reconstruction unit comprises:
a make-in-line modulation unit which generates an object light complex amplitude in-line hologram ($J^j_{OL}$) and an illumination light complex amplitude in-line hologram ($J^j_{QL}$), from the reference light off-axis hologram ($I_{LR}$), the object light off-axis hologram ($I^j_{OR}$), and the illumination light off-axis hologram ($I^j_{QR}$), by eliminating a component of the off-axis spherical wave reference light (R) for each of the incident directions ($\theta^j$, j= 1, ..., N);
a light wave calculation unit which derives, for each of the incident directions ($\theta^j$, j=1, ..., N) on an arbitrary reconstruction plane ($Z=Z_P$), from the object light complex amplitude in-line hologram ($J^j_{OL}$) and the illumination light complex amplitude in-line hologram ($J^j_{QL}$), a reconstructed object light wave ($h^j$) of the object light ($O^j$), a reconstructed illumination light wave ($c^j$) of the illumination light ($Q^j$), a phase component ($\xi^j=c^j/|c^j|$) contained in the reconstructed illumination light wave ($c^j$), and a phase adjusted reconstruction light wave ($h^j/\xi^j$) made by removing the phase component ($\xi^j$) from the reconstructed object light wave ($h^j$); and
an image calculation unit which derives a synthetic light wave ($H_P=\Sigma h^j/\xi^j$) on the arbitrary reconstruction plane ($Z=Z_P$) by adding up the phase adjusted reconstruction light waves ($h^j/\xi^j$) for the incident directions ($\theta^j$, j= 1, ..., N), and reconstructs an object image ($S_P=|H_P|^2$) by using the synthetic light wave ($H_P$).

2. The holographic microscope according to claim 1, wherein
the image reconstruction unit further comprises:
a pixel number increase unit which generates a pixel-increased object light complex amplitude in-line hologram ($K^j_{OL}$) and a pixel-increased illumination light complex amplitude in-line hologram ($K^j_{QL}$) having substantially increased number of pixels by subdividing a spatial sampling interval of the object light complex amplitude in-line hologram ($J^j_{OL}$) and the illumination light complex amplitude in-line hologram ($J^j_{QL}$) and performing a data interpolation to a new sampling point produced by the subdividing; and the light wave calculation unit derives the phase adjusted reconstruction light wave ($h^j/\xi^j$) by using the pixel-increased object light complex amplitude in-line hologram ($K^j_{OL}$) and the pixel-increased illumination light complex amplitude in-line hologram ($K^j_{QL}$).

3. The holographic microscope according to claim 1, wherein the image reconstruction unit further comprises an illumination light separation unit which separates and generates a reconstructed light wave of the illumination light ($Q^j$) from a hologram in which the object light ($O^j$) and the illumination light ($Q^j$) are recorded without being separated, and the storing unit stores a hologram of interference fringes between the object light ($O^j$), the illumination light ($Q^j$), and the off-axis spherical wave reference light (R) in the memory as an object light illumination light off-axis hologram ($J^j_{OQR}$) when the object light ($O^j$) and the illumination light ($Q^j$) are not separated from each other, the make-in-line modulation unit generates an object light illumination light complex amplitude in-line hologram ($J^j_{OQL}$) from the reference light off-axis hologram ($I_{LR}$) and the object light illumination light off-axis hologram ($J^j_{OQR}$) by eliminating the component of the off-axis spherical wave reference light (R), the illumination light separation unit generates, on a specific reconstruction plane ($z=z_S$), a reconstructed object light wave ($h^j$), which is a reconstructed light wave of the object light ($O^j$) containing the illumination light ($Q^j$), from the object light illumination light complex amplitude in-line hologram ($J^j_{OQL}$), and separates and generates a reconstructed illumination light wave ($c^j$), which is a reconstructed light wave of the illumination light ($Q^j$), from the reconstructed object light wave ($h^j$), the light wave calculation unit generates a new reconstructed object light wave ($h^j$) and a new reconstructed illumination light wave ($c^j$) by propagating the reconstructed object light wave ($h^j$) and the reconstructed illumination light wave ($c^j$) generated by the illumination light separation unit to the arbitrary reconstruction plane ($z=z_P$) different from the specific reconstruction plane ($z=z_S$), and derives the phase adjusted reconstruction light wave ($h^j/\xi^j$) by using the new reconstructed illumination light waves.

4. The holographic microscope according to claim 3, wherein the image reconstruction unit further comprises a pixel number increase unit which generates a pixel-increased object light illumination light complex amplitude in-line hologram ($K^j_{OQL}$) having substantially increased number of pixels by subdividing a spatial sampling interval of the object light illumination light complex amplitude in-line hologram ($J^j_{OQL}$) and performing a data interpolation to a new sampling point produced by the subdividing, and the illumination light separation unit derives the reconstructed object light wave ($h^j$) by using the pixel-increased object light illumination light complex amplitude in-line hologram ($K^j_{OQL}$).

5. The holographic microscope according to claim 1, wherein the angle change unit comprises a condenser and a reflector, wherein the reflector makes a parallel light having a larger diameter than that of the condenser go into the condenser from an arbitrary direction leaning to an optic axis of the condenser.

6. A data processing method for a high-resolution hologram image, comprising the steps of:

acquiring a reference light off-axis hologram ($I_{LR}$) of interference fringes between an in-line spherical wave reference light (L) and an off-axis spherical wave reference light (R);

acquiring object light off-axis holograms ($J^j_{OR}$, j=1, ..., N) of interference fringes between the off-axis spherical wave reference light (R) and object lights ($O^j$, j=1, ..., N) emitted from an object illuminated with illumination lights ($Q^j$, j=1, ..., N) having different incident directions ($\theta^j$, j=1, ..., N), and illumination light off-axis holograms ($J^j_{QR}$, j=1, ..., N) of interference fringes between the illumination lights ($Q^j$, j=1, ..., N) and the off-axis spherical wave reference light (R) for each of the incident directions, wherein the off-axis holograms ($I_{LR}$, $J^j_{OR}$, $J^j_{QR}$, j=1, ..., N) are acquired under conditions that each of the object lights ($O^j$, j=1, ..., N) is emitted from a localized region, and the localized region and virtual-point-light-sources of the in-line spherical wave reference light (L) and the off-axis spherical wave reference light (R) are in close proximity to each other;

generating an object light complex amplitude in-line hologram ($J^j_{OL}$) from the reference light off-axis hologram ($I_{LR}$) the object light hologram ($J^j_{OR}$), and an illumination light complex amplitude in-line hologram ($J^j_{QL}$) from the reference light off-axis hologram ($I_{LR}$) and hologram ($J^j_{QR}$), respectively, by eliminating a component of the off-axis spherical wave reference light (R), for each of the incident directions ($\theta^j$, j=1, ..., N);

deriving, for each of the incident directions ($\theta^j$, j=1, ..., N) on an arbitrary reconstruction plane ($z=z_P$), a reconstructed object light wave ($h^j$) of the object light ($O^j$) from the object light complex amplitude in-line hologram ($J^j_{OL}$), a reconstructed illumination light wave ($c^j$) of the illumination light ($Q^j$) from the illumination light complex amplitude in-line hologram ($J^j_{QL}$), a phase component ($\xi^j=c^j/|c^j|$) contained in the reconstructed illumination light wave ($c^j$), and a phase adjusted reconstruction light wave ($h^j/\xi^j$) made by removing the phase component ($\xi^j$) from the reconstructed object light wave ($h^j$); and deriving a synthetic light wave ($H_P=\Sigma h^j/\xi^j$) on the arbitrary reconstruction plane ($z=z_P$) by adding up the phase adjusted reconstruction light waves ($h^j/\xi^j$) for the incident directions ($\theta^j$, j=1, ..., N), and then reconstructing an object image ($S_P=|H_P|^2$) by using the synthetic light wave ($H_P$).

7. The data processing method according to claim 6, wherein the off-axis spherical wave reference light (R) is a reflection light from a minute sphere surface.

8. The data processing method according to claim 6, wherein a plurality of photo-detectors are arranged so that the photo-detectors face the localized region where the object lights are emitted, and each of the holograms is acquired by using the plurality of the photo-detectors.

9. A data processing method for a high-resolution hologram image, comprising the steps of:

acquiring a reference light off-axis hologram ($I_{LR}$) of interference fringes between an in-line spherical wave reference light (L) and an off-axis spherical wave reference light (R);

acquiring object light off-axis holograms ($J^j_{OR}$, j=1, ..., N) of interference fringes between the off-axis spherical wave reference light (R) and object lights ($O^j$, j=1, ..., N) emitted from an object illuminated with illumination lights ($Q^j$, j=1, ..., N) having different incident directions ($\theta^j$, j=1, ..., N), and illumination light off-axis holograms ($J^j_{QR}$, j=1, ..., N) of interference fringes between the illumination lights ($Q^j$, j=1, ..., N) and the off-axis spherical wave reference light (R) for each of the incident directions, wherein the off-axis holograms ($I_{LR}$, $J^j_{OR}$, $J^j_{QR}$, j=1, ..., N) are acquired under conditions that each of the object lights ($Q^j$, j=1, ..., N) is emitted from a localized region, and the localized region and virtual-point-light-sources of the in-line spherical wave reference light (L) and the off-axis spherical wave reference light (R) are in close proximity to each other;

deriving a synthetic light wave ($H_P$) by adding up light waves of the object lights ($O^j$, j=1, ..., N) after adjusting phases thereof on an arbitrary reconstruction plane ($z=z_P$); and reconstructing an object image ($S_P=|H_P|^2$) by using the synthetic light wave ($H_P$), wherein the adjusting of the phases is performed based on that the object light ($O^j$) recorded in the hologram is a superposed light of reflection lights generated by reflection of the illumination light ($Q^j$) at each point in the localized region of the object, and a phase of the reflection light composing the object light ($O^j$) at a position where the reflection light is generated and a phase of the illumination light ($Q^j$) generating the reflection light at the position are equal.

10. The data processing method according to claim 6, further comprising the steps of:

generating a pixel-increased object light complex amplitude in-line hologram ($K^j_{OL}$) and a pixel-increased illumination light complex amplitude in-line hologram ($K^j_{QL}$) having substantially increased number of pixels by subdividing a spatial sampling interval of the object light complex amplitude in-line hologram ($J^j_{OL}$) and the illumination light complex amplitude in-line hologram ($J^j_{QL}$), respectively, and performing a data interpolation to a new sampling point produced by the subdividing; and deriving the phase adjusted reconstruction light wave ($h^j/\xi^j$) using the pixel-increased object light complex amplitude in-line hologram ($K^j_{OL}$) and the pixel-increased illumination light complex amplitude in-line hologram ($K^j_{QL}$).

11. The data processing method according to claim 9, wherein the off-axis spherical wave reference light (R) is a reflection light from a minute sphere surface.

12. The data processing method according to claim 9, wherein a plurality of photo-detectors are arranged so that the photo-detectors face the localized region where the object lights are emitted, and each of the holograms is acquired by using the plurality of the photo-detectors.

13. A data processing method for a high-resolution hologram image, comprising the steps of:

acquiring a reference light off-axis hologram ($I_{LR}$) of interference fringes between an in-line spherical wave reference light (L) and an off-axis spherical wave reference light (R), acquiring object light illumination light off-axis holograms ($J^j_{OQR}$, j=1, ..., N) of interference fringes between the off-axis spherical wave reference light (R), object lights ($O^j$, j=1, ..., N) emitted from an object illuminated with illumination lights ($Q^j$, j=1, ..., N) having different incident directions ($\theta^j$, j=1, ..., N), and the illumination lights ($Q^j$, j=1, ..., N) for each of the incident directions when the object light ($O^j$) and the illumination light ($Q^j$) are not separated from each other, wherein the off-axis holograms ($I_{LR}$, $J^j_{OQR}$, j=1, ..., N) are acquired under conditions that each of the object lights ($O^j$, j=1, ..., N) is emitted from a localized region, and the localized region and the virtual-point-light-sources of the in-line spherical wave reference light (L) and the off-axis spherical wave reference light (R) are in close proximity to each other;

generating object light illumination light complex amplitude in-line holograms ($J^j_{OQL}$) from the reference light off-axis hologram ($I_{LR}$) and the object light illumination light off-axis holograms ($J^j_{OQR}$), by eliminating a component of the off-axis spherical wave reference light (R) for each of the incident directions ($\theta^j$, j=1, ..., N);

generating, on a specific reconstruction plane ($z=z_S$), a reconstructed object light wave ($h^j$), which is a reconstructed light wave of the object light ($O^j$) containing the illumination light ($O^j$), from the object light illumination light complex amplitude in-line hologram ($J^j_{OQL}$), and separating a reconstructed illumination light wave ($c^j$), which is a reconstructed light wave of the illumination light ($Q^j$), from the reconstructed object light wave ($h^j$) for each of the incident directions ($\theta^j$, j=1, ..., N);

generating a new reconstructed object light wave ($h^j$) and a new reconstructed illumination light wave ($c^j$) by propagating the reconstructed object light wave ($h^j$) and the reconstructed illumination light wave ($c^j$) to an arbitrary reconstruction plane ($z=z_P$) different from the specific reconstruction plane ($z=z_S$), and deriving, on the arbitrary reconstruction plane ($z=z_P$), a phase component ($\xi^j=c^j/|c^j|$) contained in the new reconstructed illumination light wave ($c^j$) and a phase adjusted reconstruction light wave ($h^j/\xi^j$) by eliminating the phase component ($\xi^j$) from the new reconstructed object light wave ($h^j$); and deriving a synthetic light wave ($H_P=\Sigma h^j/\xi^j$) on the arbitrary reconstruction plane ($z=z_P$) by adding up the phase adjusted reconstruction light waves ($h^j/\xi^j$) for the incident directions ($\theta^j$, j=1, ..., N), and then reconstructing an object image ($S_P=|H_P|^2$) using the synthetic light wave ($H_P$).

14. The data processing method according to claim 13, further comprising the steps of:

generating a pixel-increased object light illumination light complex amplitude in-line hologram ($K^j_{OQL}$) having substantially increased number of pixels by subdividing a spatial sampling interval of the object light illumination light complex amplitude in-line hologram ($J^j_{OQL}$) and performing a data interpolation to a new sampling point produced by the subdividing; and deriving the reconstructed object light wave ($h^j$) using the pixel-increased object light illumination light complex amplitude in-line hologram ($K^j_{OQL}$).

15. The data processing method according to claim 13, wherein
the off-axis spherical wave reference light (R) is a reflection light from a minute sphere surface.

16. The data processing method according to claim 13, wherein
a plurality of photo-detectors are arranged so that the photo-detectors face the localized region where the object lights are emitted, and each of the holograms is acquired by using the plurality of the photo-detectors.

17. The data processing method according to claim 13, wherein
the illumination lights ($Q^j$, $j=1, \ldots, N$) have a condensing point and recorded in the object light illumination light off-axis holograms ($I^j_{OQR}$) in a spread state after passing the condensing point.

* * * * *